United States Patent
Manta et al.

(10) Patent No.: US 12,253,169 B1
(45) Date of Patent: Mar. 18, 2025

(54) HYDRO-MECHANICAL PARK-BY-WIRE SHIFT SYSTEMS, TRANSMISSIONS INCORPORATING THE SAME, AND METHODS FOR TRANSMISSIONS

(71) Applicant: ALLISON TRANSMISSION, INC., Indianapolis, IN (US)

(72) Inventors: Ionut Manta, Avon, IN (US); Nicholas Walke, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/525,056

(22) Filed: Nov. 30, 2023

(51) Int. Cl.
F16H 63/34 (2006.01)
F15B 15/26 (2006.01)

(52) U.S. Cl.
CPC ........ *F16H 63/3483* (2013.01); *F15B 15/261* (2013.01)

(58) Field of Classification Search
CPC ..... F15B 15/261; F16H 63/3416–3491; B60T 1/005; B60T 1/062
See application file for complete search history.

(56) References Cited

U.S. PATENT DOCUMENTS

| | | | | |
|---|---|---|---|---|
| 2,912,085 A * | 11/1959 | De Lorean | ............... | B60T 1/005 192/219.5 |
| 3,912,050 A * | 10/1975 | Iwanaga | .................. | B60T 1/005 192/220.2 |
| 7,082,851 B2 * | 8/2006 | Whitmarsh | ............. | F16H 63/48 74/473.11 |
| 7,284,648 B2 | 10/2007 | Reed et al. | | |
| 8,397,881 B2 * | 3/2013 | Kim | ........................ | B60T 11/04 188/82.2 |
| 8,944,232 B2 | 2/2015 | Schmidt et al. | | |
| 9,791,013 B2 * | 10/2017 | Spaulding | ............... | F16F 1/123 |
| 10,443,723 B2 | 10/2019 | Bormann | | |
| 10,648,560 B2 | 5/2020 | Kokubu et al. | | |
| 10,731,758 B2 * | 8/2020 | Herrmann | ............... | F16H 63/48 |
| 10,816,091 B2 | 10/2020 | Novak et al. | | |
| 11,137,073 B2 | 10/2021 | Klein et al. | | |
| 11,168,788 B2 * | 11/2021 | Gebert | ................ | F16H 63/3491 |
| 11,261,967 B2 | 3/2022 | Wiesner et al. | | |
| 11,273,802 B2 | 3/2022 | Hanker et al. | | |
| 11,441,680 B2 * | 9/2022 | Kimura | ................... | F02N 11/08 |
| 2020/0248806 A1 | 8/2020 | Klein | | |

(Continued)

FOREIGN PATENT DOCUMENTS

| CN | 111868420 A | 10/2020 |
|---|---|---|
| DE | 102019134730 A1 | 6/2021 |

(Continued)

*Primary Examiner* — James J Taylor, II
(74) *Attorney, Agent, or Firm* — Taft Stettinius & Hollister LLP; Stephen F. Rost

(57) ABSTRACT

Transmissions, park systems for transmissions, and methods for transmissions are envisioned. A transmission includes an input shaft to receive torque from a drive unit, an output shaft to transmit torque to a load, and a park system to selectively brake the output shaft. The park system includes a park assembly, an electro-hydraulic valve assembly to deliver one or more fluid pressures, and an actuation linkage having a piston axially translatable along a longitudinal axis in response to the one or more fluid pressures delivered thereto from the electro-hydraulic valve assembly.

18 Claims, 24 Drawing Sheets

(56) References Cited

U.S. PATENT DOCUMENTS

2021/0396310 A1 12/2021 Kraemer et al.
2021/0396311 A1 12/2021 Greb et al.

FOREIGN PATENT DOCUMENTS

| DE | 102020116983 A1 | 12/2021 |
| DE | 102020209016 A1 | 1/2022 |
| DE | 102020209726 A1 | 2/2022 |
| DE | 102020122693 A1 | 3/2022 |
| DE | 102020126399 A1 | 4/2022 |
| DE | 102020212584 A1 | 4/2022 |
| DE | 102021114251 A1 | 4/2022 |
| JP | 2011011579 A | 1/2011 |
| WO | 2019076531 A1 | 4/2019 |

\* cited by examiner

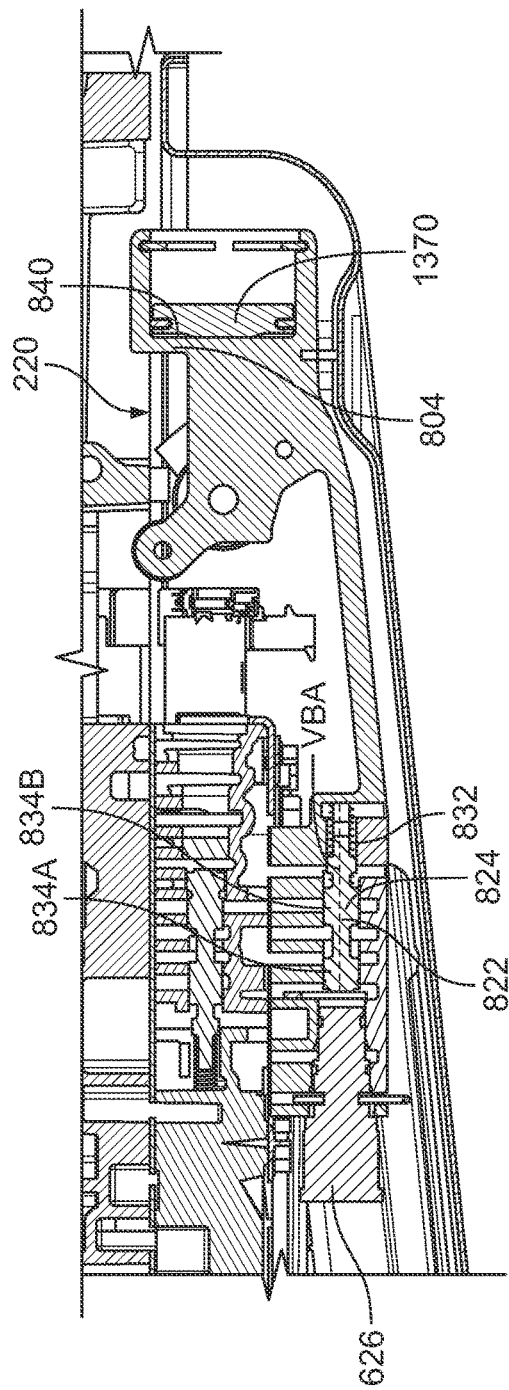
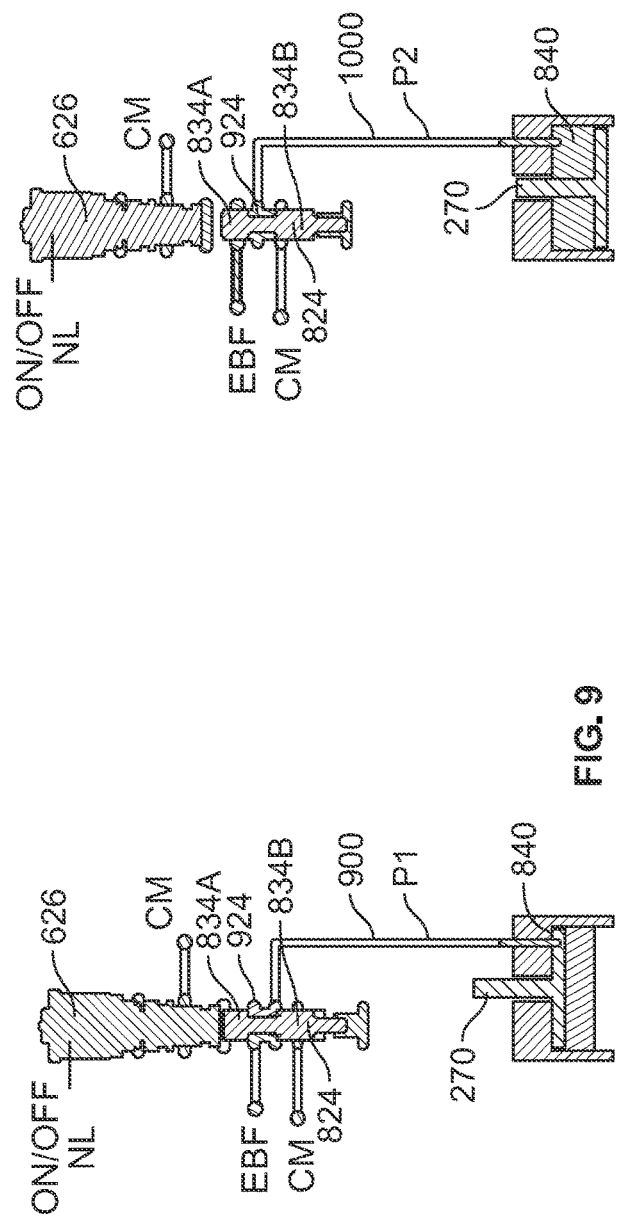
FIG. 8
FIG. 9
FIG. 10

HYDRO-MECHANICAL PARK-BY-WIRE SHIFT SYSTEMS, TRANSMISSIONS INCORPORATING THE SAME, AND METHODS FOR TRANSMISSIONS

FIELD OF THE DISCLOSURE

The present disclosure relates, generally, to park systems, and, more specifically, to hydro-mechanically actuated park systems of transmissions.

BACKGROUND

One or more park systems may be incorporated into a transmission to selectively brake one or more components of the transmission and thereby provide a park operating mode of the transmission. Systems, devices, and/or methods that avoid drawbacks associated with existing park systems remain an area of interest.

SUMMARY

The present disclosure may comprise one or more of the following features and combinations thereof.

According to one aspect of the present disclosure, a transmission may include an input shaft to receive torque from a drive unit, an output shaft to transmit torque to a load, and a park system to selectively brake the output shaft. The park system may include a park assembly, an electro-hydraulic valve assembly to deliver one or more fluid pressures, and an actuation linkage. The actuation linkage may have a piston that is axially translatable along a longitudinal axis in response to the one or more fluid pressures delivered thereto from the electro-hydraulic valve assembly. The actuation linkage may be coupled between the electro-hydraulic valve assembly and the park assembly such that translation of the piston along the longitudinal axis drives operation of the park assembly through the actuation linkage in (i) an engaged state, in which the park system resists rotation of the output shaft, and (ii) a disengaged state, in which the park system permits rotation of the output shaft. The actuation linkage may include a plate pivotally coupled to the piston such that movement of the piston along the longitudinal axis causes rotation of the plate about a rotational axis. The actuation linkage may include a biasing element surrounding the rotational axis that applies a biasing force to the plate to urge interaction between the plate and the piston. The biasing element may be wound around a sleeve of the actuation linkage such that the biasing element is at least partially retained around the rotational axis by the sleeve.

In some embodiments, the sleeve may be mounted on the rotational axis and configured for linear movement along the rotational axis in use of the park system. Additionally, in some embodiments, the plate may be formed to include at least one mount aperture, and a mount tang of the biasing element may extend through the at least one mount aperture such that the biasing element is at least partially retained in place by the plate. The at least one mount aperture may extend through the plate in a direction at an angle relative to the rotational axis, the mount tang may include a first portion and a second portion interconnected with one another by a bend, the first portion may extend through the at least one mount aperture in the direction, and the second portion may be arranged outside of the at least one mount aperture at an angle to the first portion.

In some embodiments, the plate may be supported for rotation about the rotational axis by a bushing that is arranged between the plate and an interior surface of a case of the transmission. The plate may be at least partially arranged along the rotational axis between the sleeve and the bushing.

In some embodiments, the plate may include a body that surrounds the rotational axis, a first mount extension appended to the body that extends outwardly away from the body in a first direction, and a second mount extension appended to the body opposite the first mount extension that extends outwardly away from the body in a second direction opposite the first direction. One of the first mount extension and the second mount extension may be pivotally coupled to the piston, and the other of the first mount extension and the second mount extension may be pivotally coupled to a rod of the actuation linkage that is adapted for linear translation in use of the park system. In some embodiments still, the first mount extension and the second mount extension may define separate structures spaced from one another.

In some embodiments, the park system may include a magnet assembly affixed to the piston for axial translation therewith that includes at least one magnet and a position sensor to detect a position of the at least one magnet in use of the park system. In some embodiments still, the piston may be formed to include a first groove at an outer periphery thereof and a second groove at the outer periphery, and the first groove and the second groove may be spaced from one another in a direction parallel to the longitudinal axis. The park system may include a locking pin sized for positioning in the first groove or the second groove to block translation of the piston along the longitudinal axis, when the park system is in the engaged state, the locking pin may be positioned in one of the first annular groove and the second annular groove, and when the park system is in the disengaged state, the locking pin may be positioned in the other of the first annular groove and the second annular groove.

According to another aspect of the present disclosure, a park assembly to selectively brake an output shaft of a transmission may include a park assembly, an electro-hydraulic valve assembly to deliver one or more fluid pressures, and an actuation linkage. The actuation linkage may have a piston that is axially translatable along a longitudinal axis in response to the one or more fluid pressures delivered thereto from the electro-hydraulic valve assembly. The actuation linkage may be coupled between the electro-hydraulic valve assembly and the park assembly such that translation of the piston along the longitudinal axis drives operation of the park assembly through the actuation linkage in (i) an engaged state, in which the park system resists rotation of the output shaft, and (ii) a disengaged state, in which the park system permits rotation of the output shaft. The actuation linkage may include a plate pivotally coupled to the piston such that movement of the piston along the longitudinal axis causes rotation of the plate about a rotational axis. The actuation linkage may include a sleeve mounted around the rotational axis that is configured for linear movement along the rotational axis in use of the park system. The plate may be supported for rotation about the rotational axis by a bushing of the actuation linkage. The plate may be arranged along the rotational axis at least partially between the sleeve and the bushing.

In some embodiments, the sleeve and the bushing may cooperate to at least partially locate the plate along the rotational axis. Additionally, in some embodiments, the bushing may be formed to include a pair of slots extending therethrough that are circumferentially spaced 180 degrees from one another about the rotational axis.

In some embodiments, the actuation linkage may include a biasing element surrounding the rotational axis that applies a biasing force to the plate to urge interaction between the plate and the piston. The biasing element may be wound around the sleeve such that the sleeve, the bushing, and the biasing element cooperate to at least partially locate the plate along the rotational axis.

In some embodiments, the park system may include a magnet assembly affixed to the piston for axial translation therewith that includes at least one magnet. The park system may include a position sensor to detect a position of the at least one magnet in use of the park system.

According to yet another aspect of the present disclosure, a park assembly to selectively brake an output shaft of a transmission may include a park assembly, an electro-hydraulic valve assembly to deliver one or more fluid pressures, an actuation linkage, and a magnet assembly having at least one magnet. The actuation linkage may have a piston that is axially translatable along a longitudinal axis in response to the one or more fluid pressures delivered thereto from the electro-hydraulic valve assembly. The magnet assembly may be affixed to the piston for axial translation therewith. The actuation linkage may be coupled between the electro-hydraulic valve assembly and the park assembly such that translation of the piston along the longitudinal axis drives operation of the park assembly through the actuation linkage in (i) an engaged state, in which the park system resists rotation of the output shaft, and (ii) a disengaged state, in which the park system permits rotation of the output shaft.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 8 is a partial sectional view of the case extension taken about line 8-8 showing components of an electrohydraulic valve assembly disposed in the case extension;

FIG. 9 is a schematic depiction of fluid flow from the electrohydraulic valve assembly shown in FIG. 8 to a piston disposed in the case extension in an engaged operating state of the park system;

FIG. 10 is a schematic depiction similar to FIG. 9 of fluid flow from the electrohydraulic valve assembly to the piston in a disengaged operating state of the park system;

DETAILED DESCRIPTION

Figure 1:
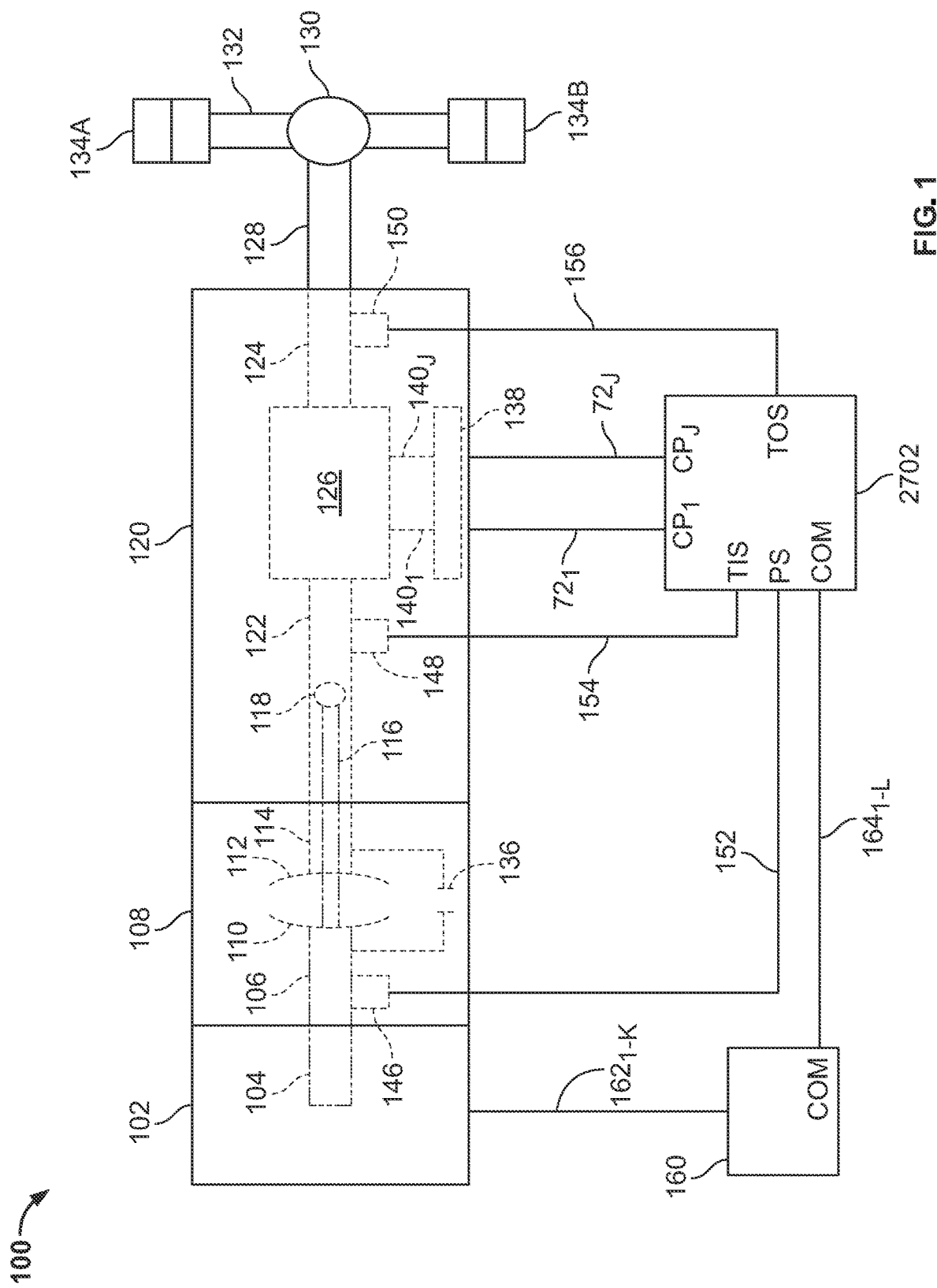
FIG. 1 is a diagrammatic view of a drive system for a vehicle incorporating a transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java™, C++™, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative drive system 100 for a vehicle includes a transmission 120. The transmission 120 is configured to receive rotational power supplied by a drive unit 102 and provide the rotational power to an illustrative load (e.g., an axle 132 and wheels 134A, 134B mounted thereto) in use thereof. The transmission 120 includes an input shaft 122, an output shaft 124, and a park system 200 (see FIG. 2). The input shaft 122 includes, or is otherwise embodied as, any structure or collection of structures configured to receive torque/rotational power from the drive unit 102. The output shaft 124 includes, or is otherwise embodied as, any structure or collection of structures configured to transmit torque/rotational power from the input shaft 122 to a load, which, in addition to the axle 132 and the wheels 134A, 134B, may include one or more transaxles, differentials, transfer boxes, final drives, and/or wheels, for example. As will be apparent from the discussion that follows, the park system 200 is configured to selectively brake the output shaft 124 during a park operational mode of the transmission 120.

Figure 2:
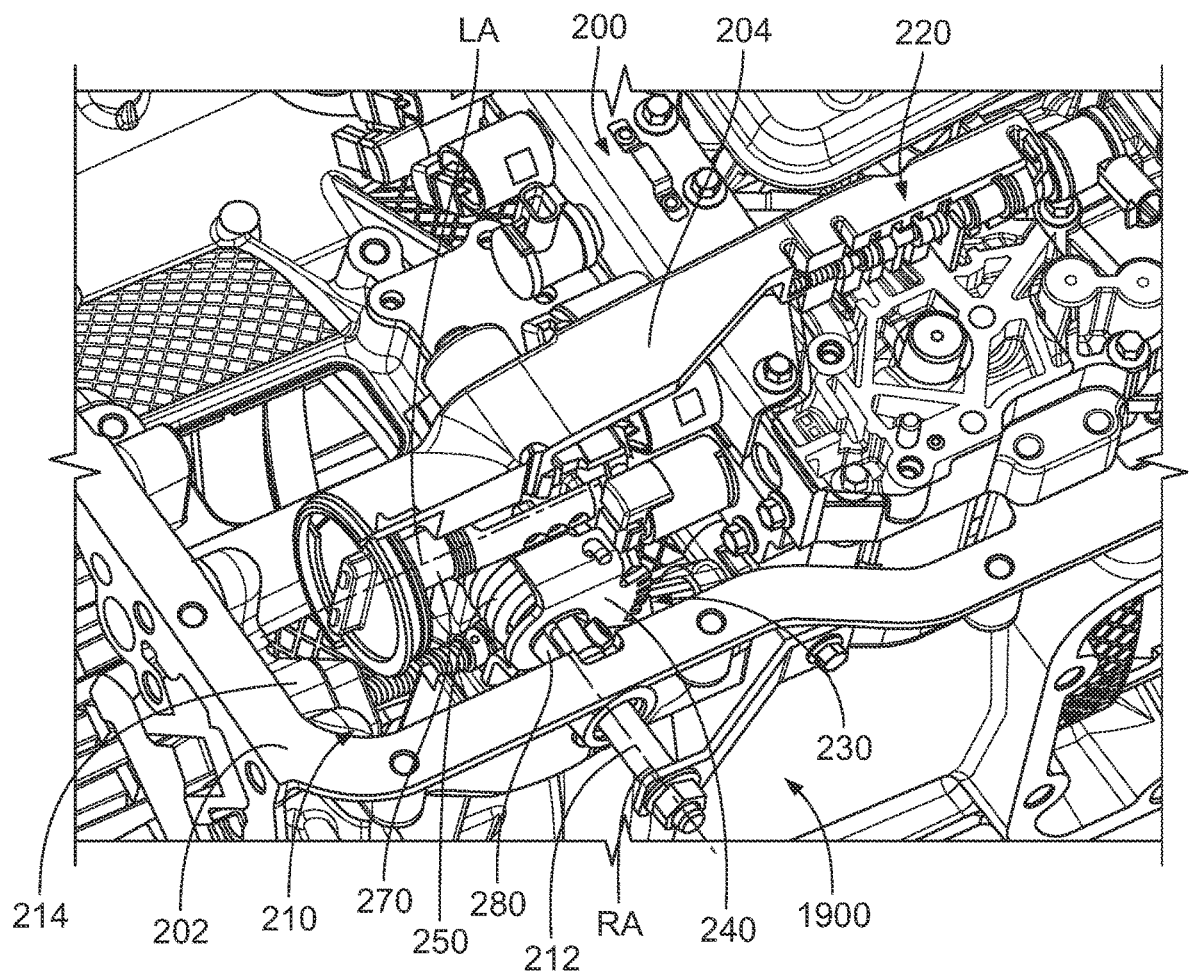
FIG. 2 is a perspective view of a park system adapted for inclusion in the drive system of FIG. 1 with a case extension shown partially cut-away.
Figure 3:
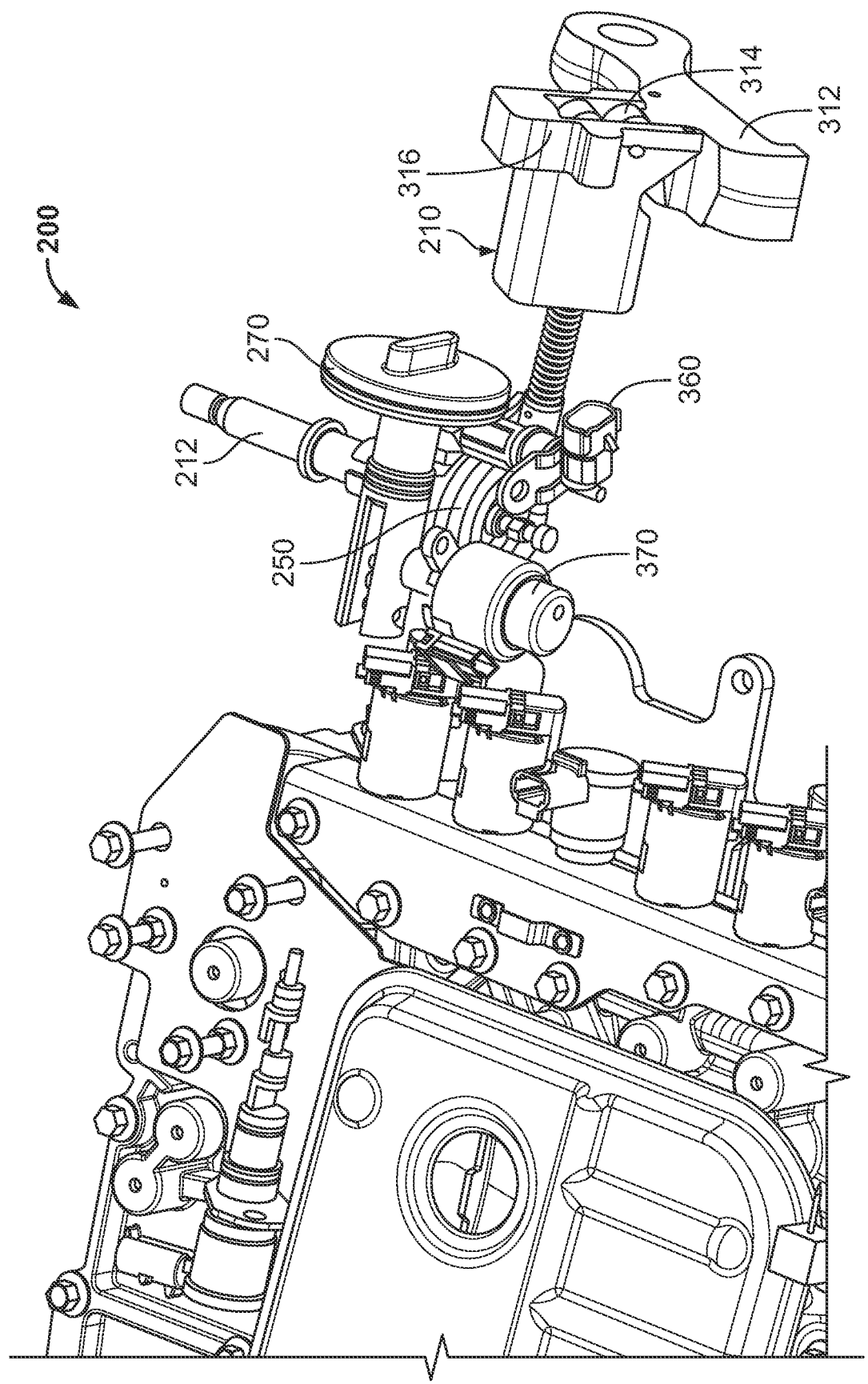
FIG. 3 is another perspective view of the park system shown in FIG. 2 with certain features omitted and/or obscured for the sake of simplicity.

Referring now to FIGS. 2 and 3, the illustrative park system 200 includes a park assembly or park gear assembly 210. At least in some embodiments, the park assembly 210 includes a structure (e.g., a gear) arranged in contact with the output shaft 124. In some embodiments, the structure may at least partially receive the output shaft 124 such that inner teeth or splines of the structure (not shown) mate or mesh with corresponding features (e.g., grooves, notches, recesses, channels, or the like) of the output shaft 124. In any case, it should be appreciated that complementary features of the structure and the output shaft 124 couple the structure and the output shaft 124 for common rotation and/or lack thereof.

The illustrative park system 200 includes an electro-hydraulic valve assembly 220 coupled to the park assembly 210. The electro-hydraulic valve assembly 220 includes, or is otherwise embodied as, a collection of structures operable in combination with one another to deliver one or more fluid pressures to a piston 270 of an actuation linkage 230 of the park system 200, as described in greater detail below. In the illustrative embodiment, the electro-hydraulic valve assembly 220 includes a valve element or spool 822 (see FIG. 8) that is movable to selectively supply hydraulic fluid pressure to the piston 270. Therefore, the illustrative electro-hydraulic valve assembly 220 includes an electro-hydraulic valve 824 configured to deliver fluid pressure to the piston 270 in response to one or more control signals issued to the valve assembly 220 (i.e., a solenoid thereof) by a control system.

The park system 200 illustratively includes the actuation linkage 230 coupled between the electro-hydraulic valve assembly 220 and the park gear assembly 210. The piston 270 of the actuation linkage 230 is axially translatable along a longitudinal axis LA in response to the one or more fluid pressures delivered thereto from the electro-hydraulic valve assembly 220, as further discussed below. As will be apparent from the discussion that follows, the actuation linkage 230 includes a number of mechanical and/or electro-mechanical structures that cooperate to operatively couple the electro-hydraulic valve assembly 220 to the park assembly 210. Consequently, in use of the transmission 120, the electro-hydraulic valve assembly 220 drives operation of the park assembly 210 through the actuation linkage 230 to establish a plurality of operating states of the park system 200. In particular, through the coupling established by the actuation linkage 230, translation of the piston 270 along the longitudinal axis LA drives operation of the park assembly 210 in an engaged state 1300 (see FIG. 13) and in a disengaged state 1500 (see FIG. 15). In the engaged state 1300, the park assembly 210 constrains rotation of the structure/gear with a park pawl 312 to resist rotation of the output shaft 124. In the disengaged state 1500, the park assembly 210 allows rotation of the structure/gear to permit rotation of the output shaft 124 in a non-park operating mode of the transmission 120.

Figure 13:
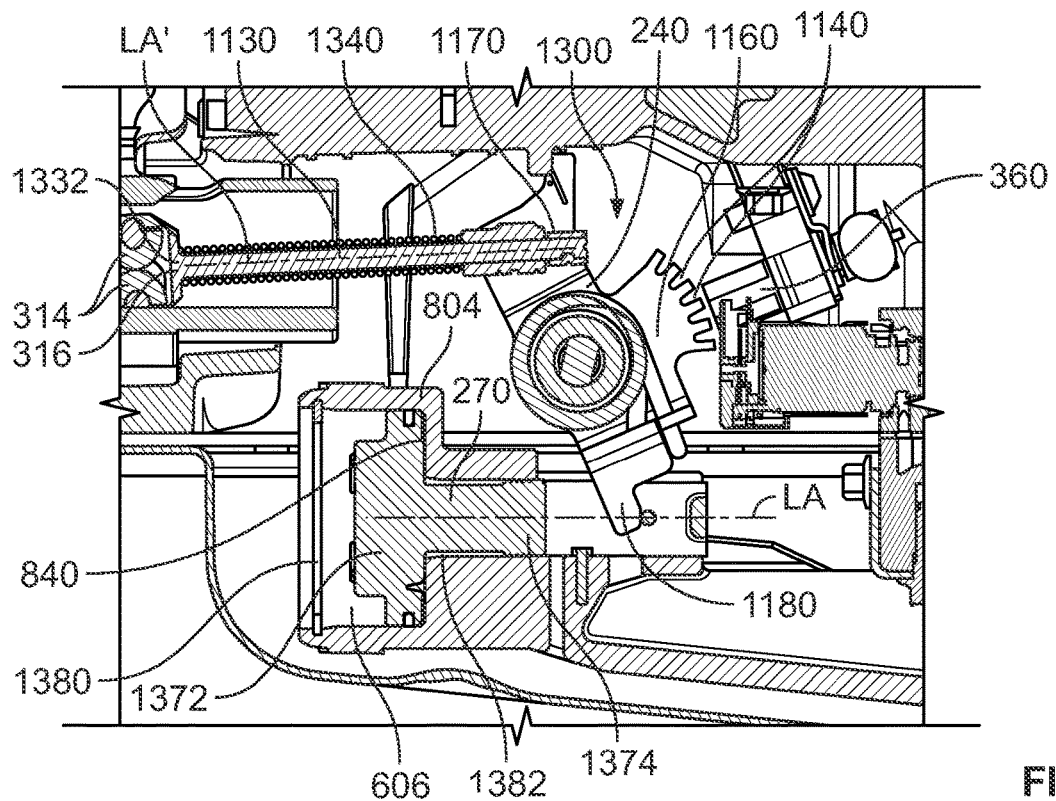
FIG. 13 is a partial sectional view of the actuation linkage of FIG. 11 depicted in the engaged operating state of the park system.
Figure 15:
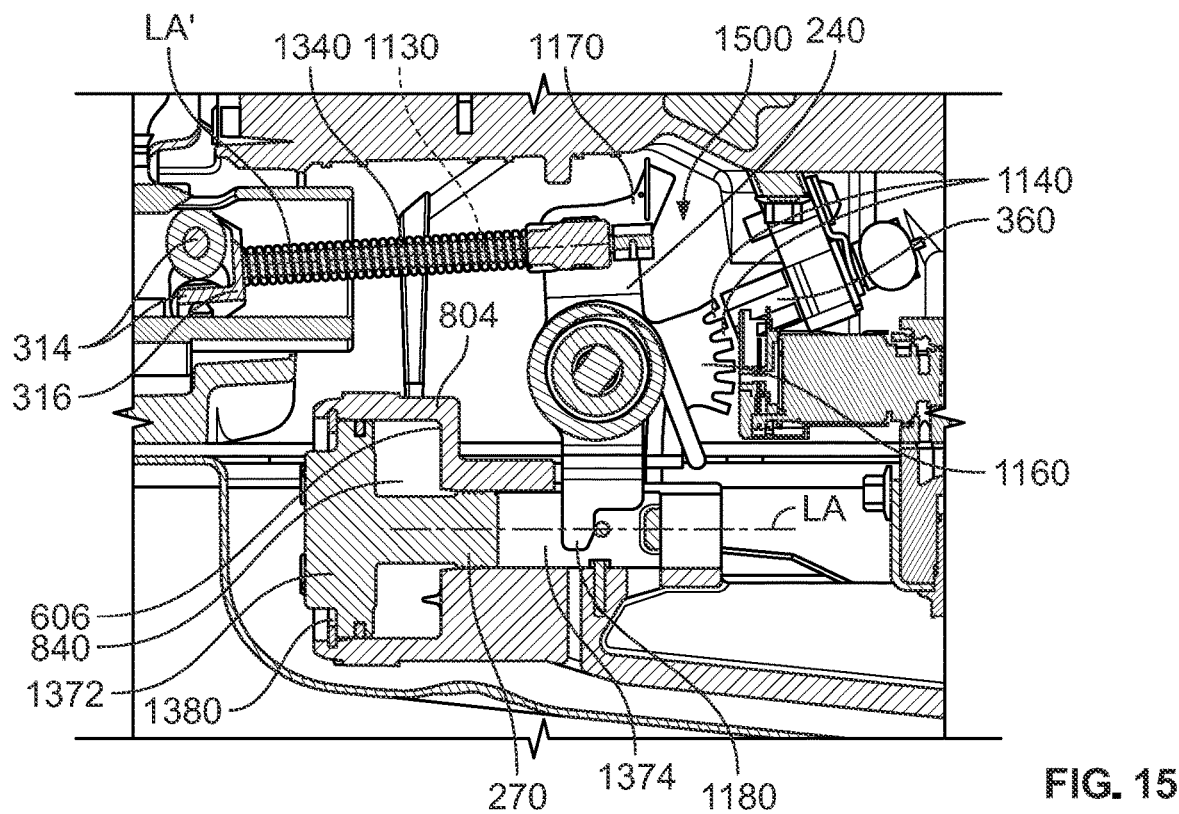
FIG. 15 is a partial sectional view similar to FIG. 13 depicting the actuation linkage in the disengaged operating state of the park system.

The illustrative actuation linkage 230 includes a plate 240 pivotally coupled to the piston 270. Through the pivotal coupling, movement of the piston 270 along the longitudinal axis LA causes rotation of the plate 240 about a rotational axis RA as shown in FIGS. 13 and 15. The actuation linkage 230 also includes a biasing element 250 that surrounds the rotational axis RA and applies a biasing force BF to the plate 240 to urge interaction between the plate 240 and the piston 270 in the engaged state 1300 and in the disengaged state 1500 of the park system 200. In the illustrative embodiment, the biasing element 250 is wound around a sleeve 1260 of the actuation linkage 230 such that the biasing element 250 is at least partially retained around the rotational axis RA by the sleeve 1260. As further discussed below, the sleeve 1260 is configured for linear movement along the rotational axis RA in use of the park system 200.

The park system 200 of the present disclosure relies on a hydraulic system 2750 (see FIG. 27) including the electro-hydraulic valve assembly 220 and other devices discussed below to drive operation of the park assembly 210 in the aforementioned operational states. In some embodiments, the hydraulic system 2750 may be employed as a substitute or replacement for a cable-actuated parking mechanism. In such embodiments, it should be appreciated that a cable-actuated parking mechanism may be omitted entirely.

In the illustrative embodiment, the transmission 120 includes a control system 2700 (see FIG. 27) that is configured to control operation of various components of the transmission 120 (e.g., one or more clutches and an electro-hydraulic system 138) and operation of the park system 200 (e.g., the electro-hydraulic valve assembly 220 and various other devices included in the hydraulic system 2750). The control system 2700 includes a controller 2702 that is communicatively coupled to various electro-mechanical components of the park system 200, among other things. Methods and/or activities that may be performed by the controller 2702 to control operation of the park system 200 and the transmission 120 are described in greater detail below with reference to FIGS. 28-32.

Referring again to FIG. 1, it should be appreciated that the illustrative transmission 120, and the drive system 100 incorporating the transmission 120, are adapted for use in one or more vehicles employed in a variety of applications. In some embodiments, the transmission 120 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the transmission 120 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the transmission 120 includes one or more clutches (not shown). The one or more clutches may be included in, or otherwise adapted for use with, the electro-hydraulic system 138 and coupled between the input shaft 122 and the output shaft 124 to selectively transmit rotational power between the shafts 122, 124 in one or more operating modes of the transmission 120. Each of the one or more clutches may be selectively engageable in response to one or more fluid pressures applied thereto.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118 through the torque converter 108.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the one or more clutches and the electro-hydraulic system 138 under control by the control system 2700, the gearing system 126 may provide, or otherwise be associated with, one or more operating ranges selectable by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134A, 134B. In this arrangement, the output shaft 124 drives the wheels 134A, 134B through the propeller shaft 128, the universal joint 130, and the axle 132 in use of the drive system 100. Of course, it should be appreciated that, in other embodiments, the output shaft 124 may drive the wheels 134A, 134B through another suitable mechanism and/or collection of structures.

The illustrative transmission 120 includes the electro-hydraulic system 138 that is fluidly coupled to the gearing system 126 via a number (i.e., J) of fluid paths $140_1$-$140_J$, where J may be any positive integer. The electro-hydraulic system 138 is configured to receive control signals provided by various electro-hydraulic control devices (not shown), such as one or more sensors and one or more flow and/or pressure control devices, for example. In response to those control signals, and under control by the control system 2700, the electro-hydraulic system 138 selectively causes fluid to flow through one or more of the fluid paths $140_1$-$140_J$ to control operation (e.g., engagement and disengagement) of one or more friction devices (e.g., the one or more clutches) included in, or otherwise adapted for use with, the gearing system 126.

Of course, it should be appreciated that the one or more friction devices may include, but are not limited to, one or more brake devices, one or more torque transmitting devices (i.e., clutches), and the like. Generally, the operation (e.g., engagement and disengagement) of the one or more friction devices is controlled by selectively controlling the friction applied by, or otherwise associated with, each of the one or more friction devices, such as by controlling fluid pressure applied to each of the friction devices, for example. In the illustrative embodiment, which is not intended to be limiting in any way, the electro-hydraulic system 138 may be coupled to, or otherwise adapted for use with, one or more brakes. Similar to the clutches, each of the one or more brakes may be controllably engaged and disengaged via fluid pressure supplied by the electro-hydraulic system 138. In any case, changing or shifting between the various gears of the transmission 120 is accomplished by selectively controlling the friction devices via control of fluid pressure within the number of fluid paths $140_1$-$140_J$.

In the illustrative drive system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 2702 via a signal path 152, and the controller 2702 is operable to process the speed signal produced by the speed sensor 146 to determine the rotational speed of the pump shaft 106/drive unit output shaft 104.

In the illustrative drive system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 2702 via a signal path 154, and the controller 2702 is operable to process the speed signal produced by the speed sensor 148 to determine the rotational speed of the turbine shaft 114/transmission input shaft 124.

Further, in the illustrative system 100, the transmission 120 includes a speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 2702 via a signal path 156. The controller 2702 is configured to process the speed signal produced by the speed sensor 150 to determine the rotational speed of the transmission output shaft 124.

In some embodiments, the electro-hydraulic system 138 includes one or more actuators configured to control various operations within the transmission 120. For example, the electro-hydraulic system 138 may include a number of actuators that are electrically connected to a number (i.e., J) of control outputs $CP_1$-$CP_J$ of the controller 2702 via a corresponding number of signal paths $72_1$-$72_J$, where J may be any positive integer as described above. Each of the actuators may receive a corresponding one of the control signals $CP_1$-$CP_J$ produced by the controller 2702 via one of the corresponding signal paths $72_1$-$72_J$. In response thereto, each of the actuators may control the friction applied by each of the friction devices by controlling the pressure of fluid within one or more corresponding fluid passageway $140_1$-$140_J$, thereby controlling the operation of one or more corresponding friction devices based on information provided by the various speed sensors 146, 148, and/or 150 in use of the system 100.

In the illustrative embodiment, the drive system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 2702 via a number (i.e., L) of signal paths 164, wherein L may be any positive integer. It should be appreciated that the one or more signal paths 164 may be referred to collectively as a data link. Generally, the drive unit controller 160 and the transmission controller 2702 are operable to share information via the one or more signal paths 164. In one embodiment, for example, the drive unit controller 160 and the transmission controller 2702 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 2702 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring again to FIG. 2, the electro-hydraulic valve assembly 220 is contained in a case extension 204 of the transmission 120 as further discussed below. Multiple structures of the actuation linkage 230 (e.g., the plate 240, the biasing element 250, the sleeve 1260, and a bushing 280) are mounted on a selector shaft 212 that extends through the main case 202 of the transmission 120 and into an interior space 214 defined by the main case 202. As described below with reference to FIG. 19, rotation of the selector shaft 212 may be driven by operation of the parking lock mechanism 1900 in the event of a hydraulic failure or fault condition.

In the illustrative embodiment, the actuation linkage 230 includes the bushing 280 which is supported by the shaft 212 on the rotational axis RA between the plate 240 and the interior wall 1204 of the main case 202. The bushing 280 includes, or is otherwise embodied as, any structure or collection of structures capable of supporting the plate 240 for rotation about the rotational axis RA. In some embodiments, the bushing 280 may include, or otherwise be embodied as, a plain bearing, a sleeve bushing, a split bushing, a clenched bushing, or the like. In any case, at least in some embodiments, the bushing 280 is configured to support the plate 240 for rotation about the rotational axis RA relative to the shaft 212. Additionally, in some embodiments, the bushing 280 is configured to support the plate 240 for rotation about the rotational axis RA with the shaft 212.

Referring now to FIG. 3, in the illustrative embodiment, the park system 200 includes the park pawl 312, a plurality of rollers 314, and a ramp (not shown). The park pawl 312 is illustratively movable to directly contact the structure/gear of the park assembly 200 (e.g., in the engaged state 1300 of the park assembly 210) and to be spaced from, and not in direct contact with, the structure/gear (e.g., in the disengaged state 1500 of the park assembly 210). The rollers 314 are movable along the ramp (e.g., in one direction) to interact with the park pawl 312 and thereby cause contact between the park pawl 312 and the structure/gear. The rollers 314 are also movable along the ramp (e.g., in another direction opposite the one direction) to cause the park pawl 312 to be spaced from the structure/gear. The rollers 314 are coupled together for common movement along and/or parallel to the ramp by a carriage or carrier 316.

Figure 11:
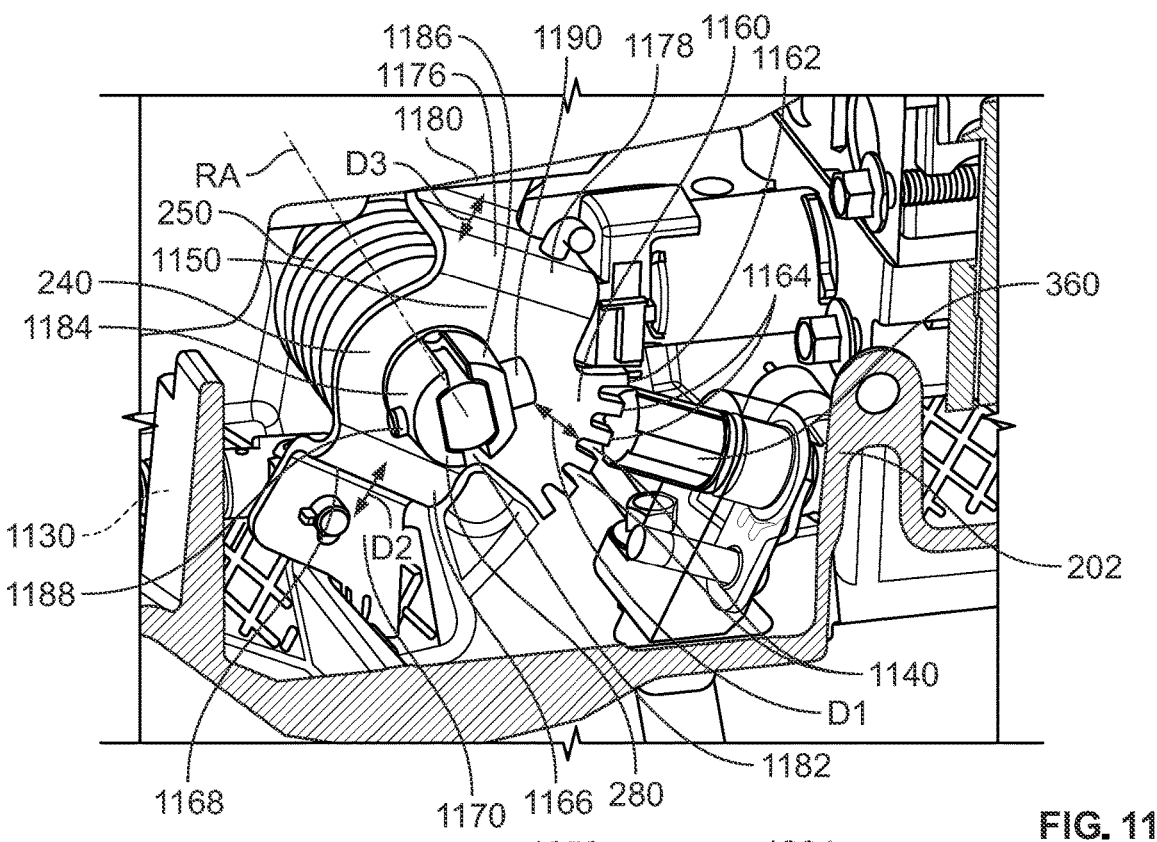
FIG. 11 is a perspective view of an actuation linkage of the park system shown in FIG. 2 having a plate with notches formed therein that are arranged proximate a position sensor.

The park system 200 illustratively includes a position sensor 360 to generate a signal indicative of a position of the plate 240 about the rotational axis RA. More specifically, as best seen in FIG. 11, the position sensor 360 is mounted to the main case 202 of the transmission 120 and configured to detect a position of one or more notches 1140 formed in the plate 240 about the rotational axis RA. In some embodiments, the sensor 360 includes, or is otherwise embodied as, any electrical device or collection of electrical devices capable of detecting a position of the plate 240 about the rotational axis RA in use of the park system 200. Additionally, in some embodiments, the sensor 360 includes, or is otherwise embodied as, a proximity sensor, such as a capacitive proximity sensor, an inductive proximity sensor, a hall effect sensor, or the like. Of course, in other embodiments, the sensor 360 may include, or otherwise be embodied as, another suitable sensor.

The park system 200 illustratively includes a locking pin 370 to selectively block translation of the piston 270 along the longitudinal axis LA and thereby secure the position of the piston 270 along the axis LA in use of the system 200. In the illustrative embodiment, the locking pin 370 includes, or is otherwise embodied as, a solenoid-driven locking pin sized for positioning in one of several grooves formed in the piston 270, as further discussed below. In other embodiments, the locking pin 370 may include, or otherwise be embodied as, another suitable device.

Figure 4:
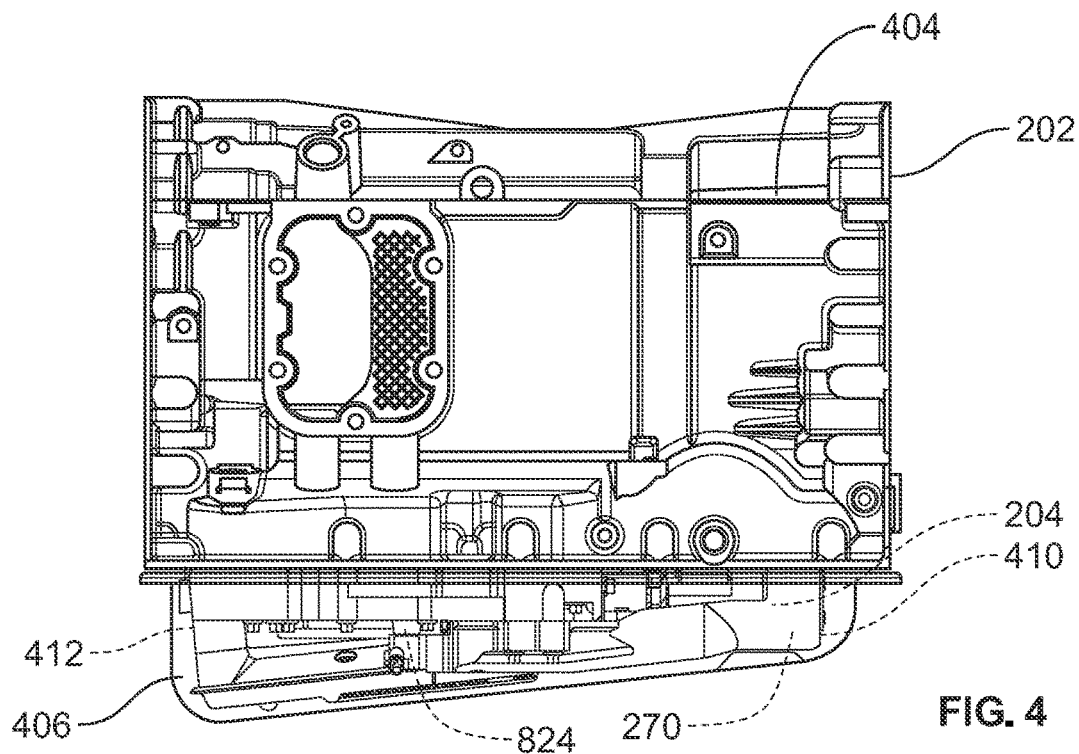
FIG. 4 is a side elevation view of a main transmission case and a case extension which are adapted to cooperatively house the park system shown in FIG. 2.
Figure 5:
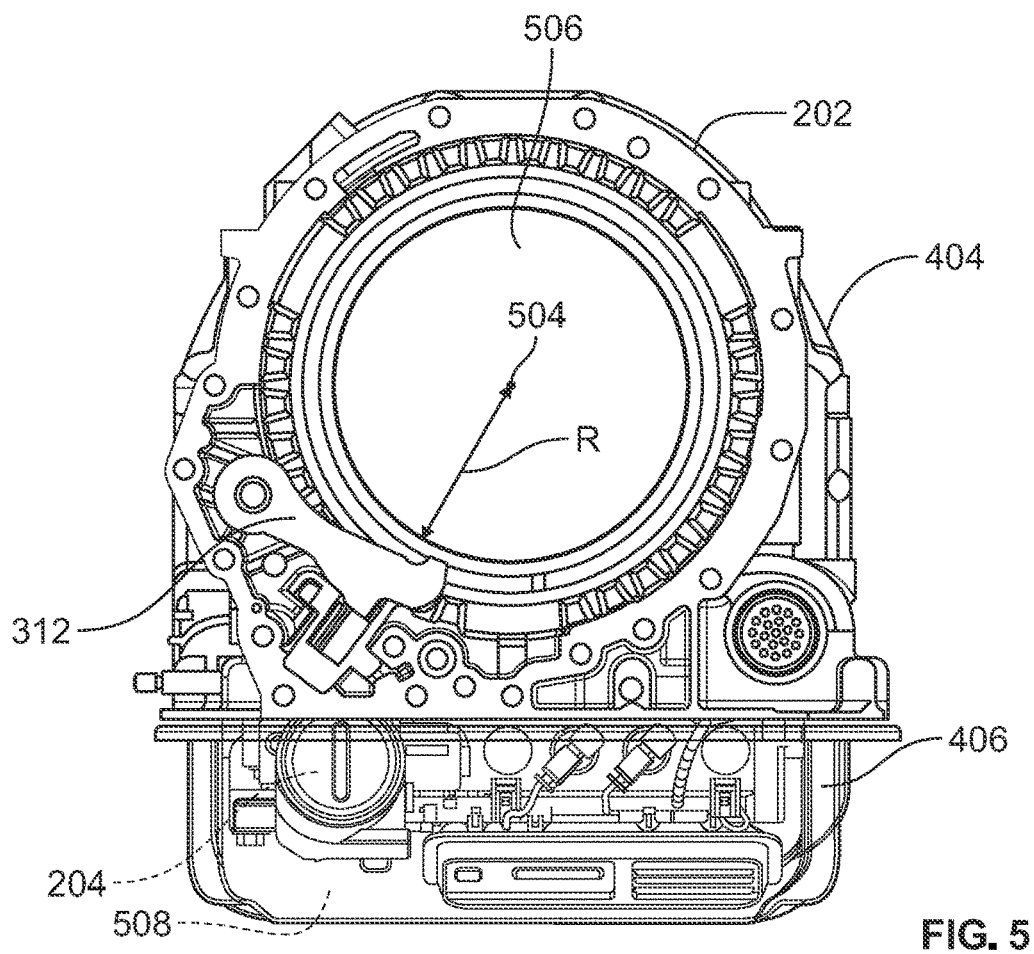
FIG. 5 is a front elevation view of the main transmission case and the case extension shown in FIG. 4.

Referring now to FIGS. 4 and 5, in at least some embodiments, the main case 202 includes, or is otherwise embodied as, a main body 404 and a secondary body 406 coupled to the main body 404. The secondary body 406 may include, or otherwise define, an oil pan as discussed below with reference to FIG. 26. The main body 404 illustratively extends circumferentially all the way around a central axis 504. In some embodiments, the main body 404 is configured to at least partially house various components of the transmission 120, such as one or more clutches, one or more elements of the gearing system 126, and/or one or more elements of the electro-hydraulic system 138, for example. As best seen in FIG. 5, the main body 404 is formed to include a cylindrical cavity 506 that extends therethrough. In some embodiments, the cavity 506 may be sized to receive the output shaft 124 of the transmission 120 therein.

In some embodiments, when the main body 404 and the secondary body 406 are coupled to one another, at least some structures of the park system 200 are disposed in an interior space 508 defined by the secondary body 406. More specifically, as best seen in FIG. 5, the case extension 204 is illustratively sized to be positioned in the interior space 508 when the main body 404 and the secondary body 406 are coupled to one another. As such, at least in some embodiments, the secondary body 406 may provide an external enclosure that covers and protects the case extension 204 and any structures contained therein, such as the electro-hydraulic valve 824 and the piston 270, for instance.

In the illustrative embodiment, the case extension 204 is located outward of the cylindrical cavity 506 in a radial direction indicated by arrow R. The arrangement of the electro-hydraulic valve 824 and the piston 270 in the case extension 204 is indicated in FIG. 4 with those components shown in phantom. When housed by the case extension 204, the piston 270 is disposed in closer proximity to one end 410 of the case extension 204 than another end 412 of the case extension 204 arranged opposite the one end 410. The electro-hydraulic valve 824 is disposed in closer proximity to the end 412 than the end 410.

Figure 6:
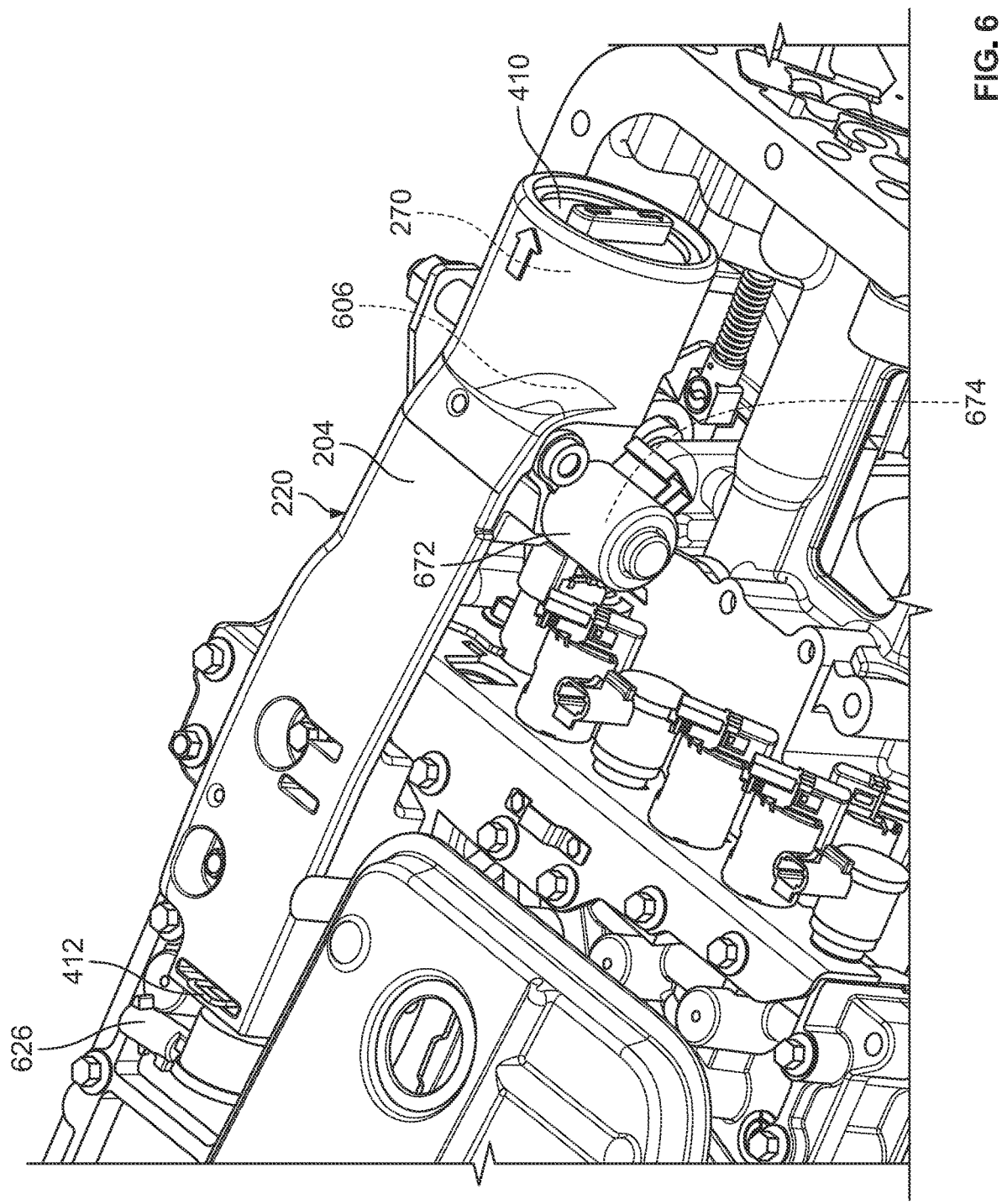
FIG. 6 is a perspective view of the case extension depicted in FIG. 4 arranged proximate a main body of the main transmission case with various components of the park system disposed in the main body.
Figure 7:
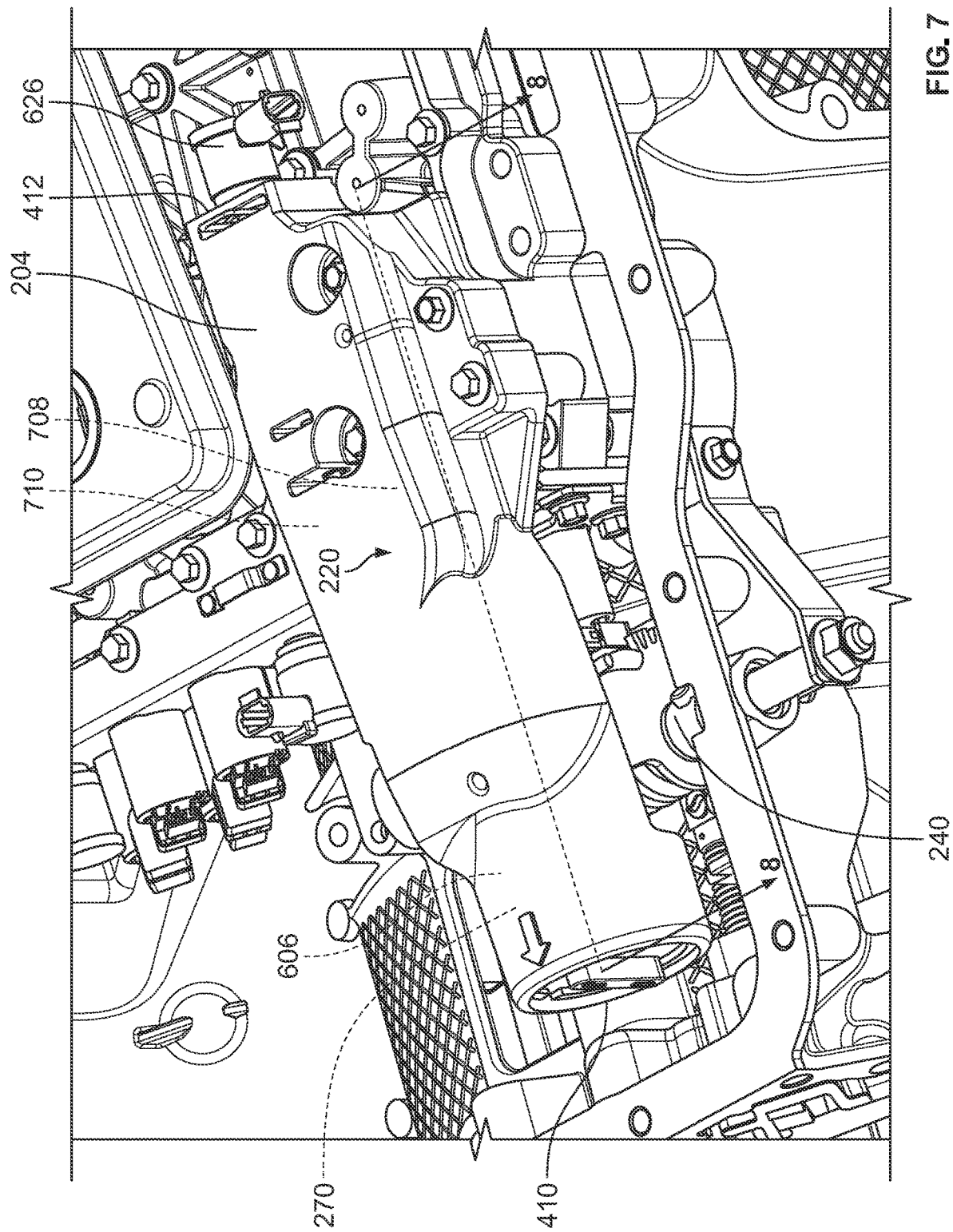
FIG. 7 is another perspective view of the case extension and the main body of the main transmission case similar to FIG. 6.

Referring now to FIGS. 6 and 7, a solenoid 626 of the electro-hydraulic valve 220 is disposed at or in close proximity to the end 412 of the case extension 204. In the illustrative embodiment, the solenoid 626 is embodied as, or otherwise includes, any device or collection of devices (e.g., electromagnets) capable of producing a controlled magnetic field through which electric current may be passed in use of the electro-hydraulic valve assembly 220. In some embodiments, the solenoid 626 may be embodied as, or otherwise include, one or more transducer(s) or the like capable of converting electrical energy into linear motion to actuate one or more components of the electro-hydraulic valve assembly 220, such as the electro-hydraulic valve 824, for example.

Figure 14:
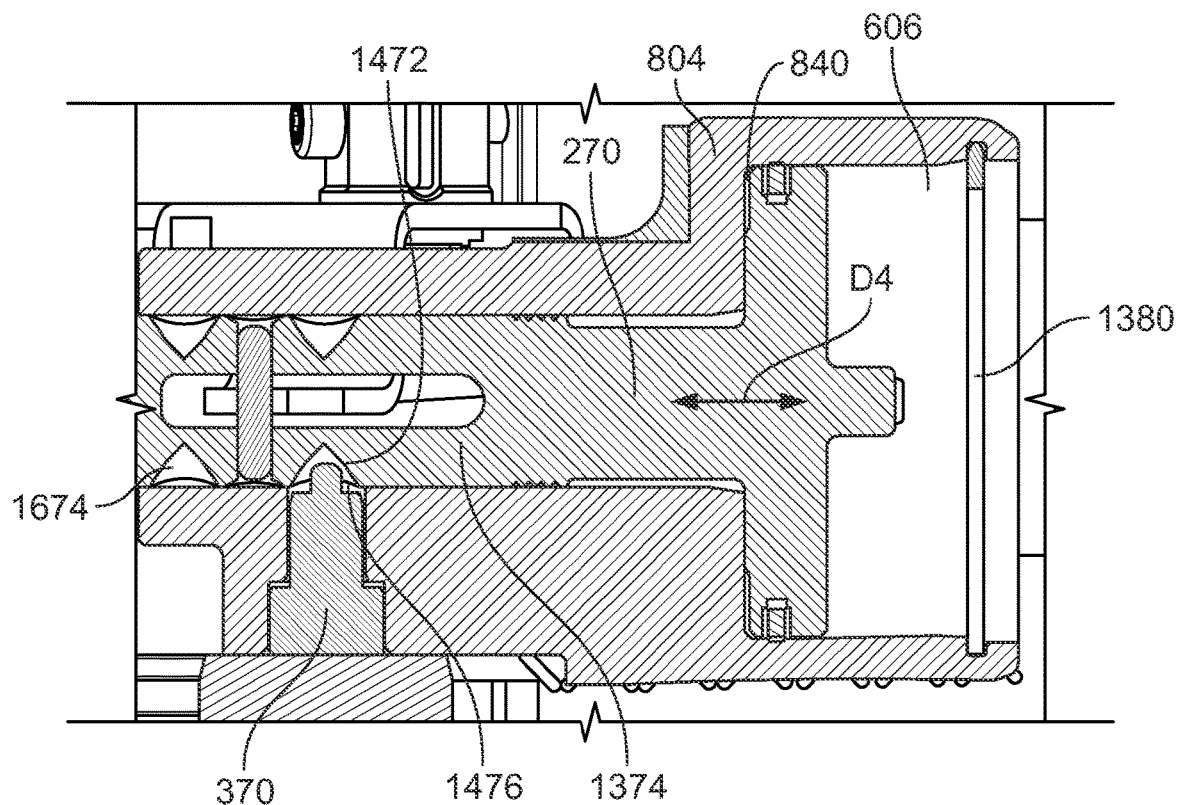
FIG. 14 is a magnified sectional view of the actuation linkage of FIG. 11 illustrating a piston of the actuation linkage having a first groove in which a locking pin is positioned in the engaged operating state of the park system.
Figure 16:
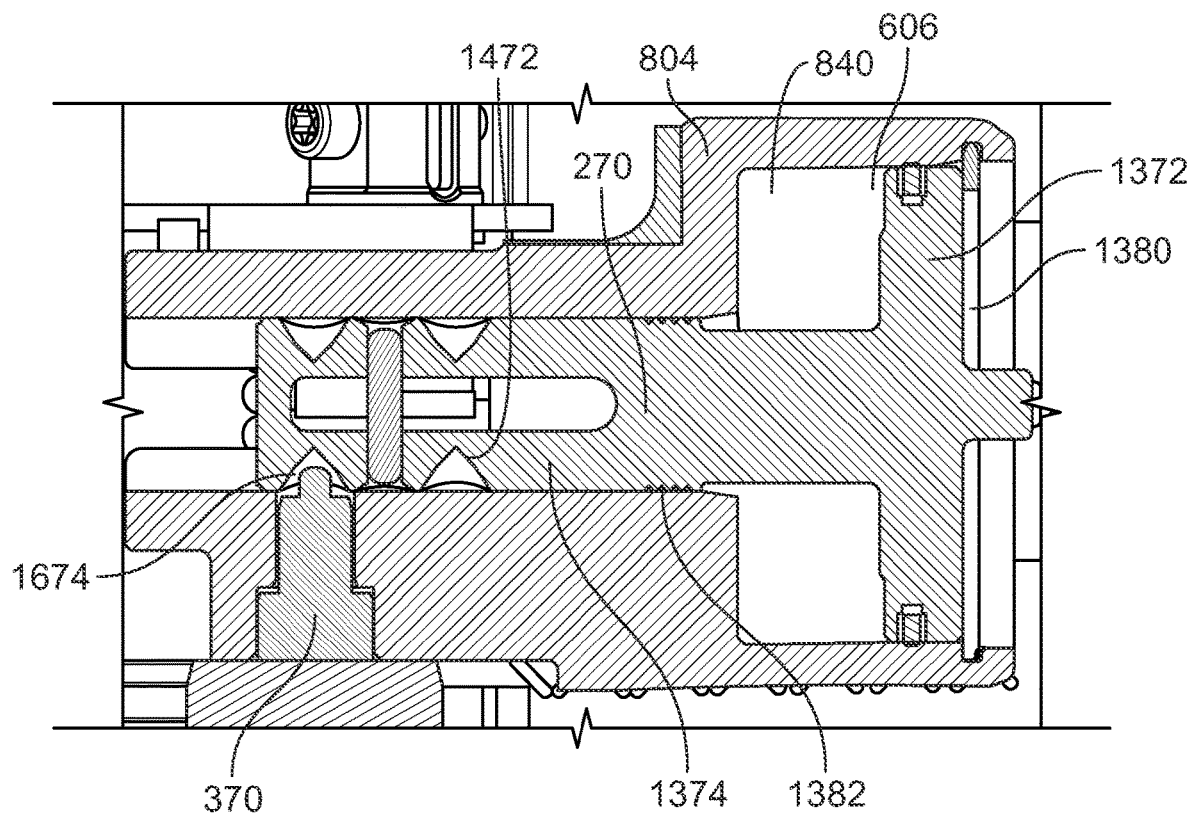
FIG. 16 is a magnified sectional view similar to FIG. 14 depicting the piston having a second groove in which the locking pin is positioned in the disengaged operating state of the park system.

In the illustrative embodiment, the case extension 204 defines an internal cavity 606 (shown in phantom) located in close proximity to the end 410 thereof in which the piston 270 is positioned. As best seen in FIGS. 14 and 16, the piston 270 is axially translatable along the longitudinal axis LA in the internal cavity 606 in response to one or more fluid pressures delivered thereto from the electro-hydraulic valve assembly 220. The internal cavity 606 is sized to accommodate a head 1372 (see FIG. 13) of the piston 270 and a piston shaft 1374 of the piston 270 as described in greater detail below.

The illustrative locking pin 370 includes a cover 672 that is coupled to the case extension 204 and extends outwardly therefrom as best seen in FIG. 6. Although the case extension 204 and the cover 672 are illustratively formed as separate structures, it should be appreciated that in some embodiments, the case extension 204 and the cover 672 may be integrally formed with one another. In any case, the cover 672 is sized to house a solenoid 674 of the locking pin 370 that is configured to drive extension of the locking pin 370 into the internal cavity 606 and retraction of the locking pin 370 outside of the internal cavity 606, as best seen in FIGS. 14 and 16.

In some embodiments, a separator plate 708 (shown in phantom) may be disposed in the case extension 204 proximate the end 412 thereof. In some configurations, the separator plate 708 may be utilized in conjunction with the case extension 204 to establish one or more passages or fluid paths for conducting hydraulic fluid from the electro-hydraulic valve assembly 220 to the piston 270. In such cases, the separator plate 708 may define, form a portion of, or otherwise be included in, a fluid distribution circuit 710 at least partially disposed in the case extension 204.

Referring now to FIG. 8, in the illustrative embodiment, the electro-hydraulic valve assembly 220 includes the electro-hydraulic valve 824, the solenoid 626, and a clip. In at least some configurations, the solenoid 626 is received by, and retained by the clip in contact with, a valve body of the electro-hydraulic valve 824 defined by the case extension 204 when the electro-hydraulic valve assembly 220 is assembled. The spool 822 is disposed in the valve body and configured for axial movement along a valve body axis VBA in response to one of more fluid pressures applied to the spool 822 by the solenoid 626. A biasing element or spring 832 disposed in a return chamber 834 applies a biasing force (not shown) to the spool 822 to resist axial movement of the spool 822 along the valve body axis VBA toward the return chamber 834 in use of the electro-hydraulic valve assembly 220.

In the illustrative embodiment, the valve element or spool 822 includes a plurality of discrete sections or lands. The spool 822 illustratively includes two lands 834A, 834B. Of course, in another embodiments, it should be appreciated that the spool 822 may include another suitable number of lands, such as more than two lands, for example. The lands 834A, 834B may each have the same diameter, at least in some cases. In other cases, the lands may have different diameters. In any case, the spool 822 cooperates with the case extension 204 to define one or more fluid chambers of the electro-hydraulic valve 824 that are configured to receive fluid (e.g., hydraulic fluid).

At least one fluid chamber of the electro-hydraulic valve 824 is fluidly coupled to the internal cavity 606 of the case extension 204. In some embodiments, the at least one fluid chamber may be fluidly coupled to the internal cavity 606 by one or more fluid passages or conduits defined within, and enclosed by, the case extension 204. Regardless, the at least one fluid chamber is in fluid communication with an actuation cavity 840 defined between an inner shoulder 804 of the case extension 204 and the piston 270. As further discussed below, one or more fluid pressures may be delivered to the actuation cavity 840 from the at least one chamber of the electro-hydraulic valve 824 to drive movement of the piston 270 along the longitudinal axis LA.

Referring now to FIGS. 9 and 10, in the illustrative embodiment, a fluid chamber 924 of the electro-hydraulic valve 824 defined between the spool 822 and the case extension 204 is fluidly coupled to the actuation cavity 840. A fluid flow path 900 is established between the fluid chamber 924 of the electro-hydraulic valve 824 and the actuation cavity 840 as illustrated in FIG. 9. A fluid flow path 1000 is established between the fluid chamber 924 of the electro-hydraulic valve 824 and the actuation cavity 840 as illustrated in FIG. 10.

The fluid flow path 900 corresponds to, and contributes to the establishment of, the engaged state 1300 of the park assembly 210. The fluid flow path 1000 corresponds to, and contributes to the establishment of, the disengaged state 1500 of the park assembly 210. It should be appreciated that each of the fluid flow paths 900, 1000 may be at least partially defined through the case extension 204, at least in some embodiments.

In the illustrative embodiment, in the engaged state 1300 of the park assembly 210, the electro-hydraulic valve 824 delivers a pressure P1 from the fluid chamber 924 to the actuation cavity 840 along the flow path 900 as shown in FIG. 9. At least in some embodiments, the pressure P1 corresponds to, or is otherwise embodied as, an exhaust backfill (EBF) pressure having a magnitude that is insufficient to drive axial translation of the piston 270 along the longitudinal axis LA. In the engaged state 1300 of the park assembly 210, the solenoid 626 applies minimal or substantially no fluid pressure to the spool 822 of the electrohydraulic valve 824. Consequently, the solenoid 626 is positioned in close proximity to, and/or in contact with, the spool 822 in the engaged state 1300 of the park assembly 210 as shown in FIG. 9.

In the illustrative embodiment, in the disengaged state 1500 of the park assembly 210, the electro-hydraulic valve 824 delivers a pressure P2 from the fluid chamber 924 to the actuation cavity 840 along the flow path 1000 as shown in FIG. 10. At least in some embodiments, the pressure P2 corresponds to, or is otherwise embodied as, a pressure having a magnitude greater than the pressure P1 which is sufficient to drive axial translation of the piston 270 along the longitudinal axis LA. In the disengaged state 1500 of the park assembly 210, the solenoid 626 applies appreciable fluid pressure to the spool 822 of the electro-hydraulic valve 824 such that the spool 822 is spaced from the solenoid 626 along the valve body axis VBA as shown in FIG. 10.

Referring now to FIG. 11, the plate 240 is illustratively arranged in the main case 202 in close proximity to the position sensor 360. The position sensor 360 is affixed to the main case 202 (e.g., mounted to the main body 404 and/or the secondary body 406) and configured to detect a position of one or more of the notches 1140 formed in the plate 240 about the rotational axis RA as indicated above. The plate 240 is at least partially supported for rotation about the rotational axis RA by the bushing 280 which is arranged between the plate 240 and the inner wall 1204 of the main case 202 of the transmission 120.

In the illustrative embodiment, the plate 240 includes a body 1150 that surrounds the rotational axis RA. The body 1150 has an indexing flange 1160 appended thereto that extends outwardly away from the body 1150 in a direction indicated by arrow D1. At an outer periphery 1162 thereof, the indexing flange 1160 is formed to include fingers 1164 defining the notches 1140 therebetween. The indexing flange 1160 illustratively includes six fingers 1164 that define five notches 1140 therebetween. Of course, it should be appreciated that in other embodiments, the indexing flange 1160 may include another suitable number of fingers 1164 and corresponding notches 1140.

In the illustrative embodiment, the notches 1140 are circumferentially spaced from one another around the indexing flange 1160 of the body 240. Each notch 1140 is indicative of a particular angular orientation of the plate 240 about the rotational axis RA in use of the park system 200. As such, based on the detection of one or more notches 1140 by the position sensor 360, a determination may be made (e.g., by the controller 2702) as to the angular orientation of the plate 240 and a corresponding operational state (i.e., the engaged state 1300 or the disengaged state 1500) of the park assembly 210.

It should be appreciated that throughout operation of the illustrative park system 200, no features are positioned in the notches 1140. In one example, as best seen in FIG. 13, no features are positioned in the notches 1140 during operation of the park assembly 210 in the engaged state 1300. In another example, as best seen in FIG. 15, no features are positioned in the notches 1140 during operation of the park assembly 210 in the disengaged state 1500.

The illustrative body 1150 of the plate 240 also includes a mount extension 1170 appended to the body 1150 that extends outwardly away from the body 1150 in a direction indicated by arrow D2. The direction D2 is illustratively different from the direction D1. In some cases, the direction D2 may be perpendicular or substantially perpendicular to the direction D1. Additionally, in some cases, the mount extension 1170 and the indexing flange 1160 may be circumferentially spaced 90 degrees, or at least 90 degrees, from one another around the rotational axis RA. In any case, the mount extension 1170 is pivotally coupled to a rod 1130 of the actuation linkage 230 that, as discussed below, is adapted for linear translation along a longitudinal axis LA' spaced from the longitudinal axis LA in use of the park system 200.

The illustrative body 1150 of the plate 240 also includes a mount extension 1180 appended to the body 1150 that extends outwardly away from the body 1150 in a direction indicated by arrow D3. The direction D3 is illustratively different from the directions D1 and D2. In some cases, the direction D3 may be perpendicular or substantially perpendicular to each of the directions D1 and D2. Additionally, in some cases, the mount extension 1180 and the indexing flange 1160 may be circumferentially spaced 90 degrees, or at least 90 degrees, from one another around the rotational axis RA. In some cases still, the mount extension 1180 and the mount extension 1170 may be circumferentially spaced 180 degrees, or at least 180 degrees, from one another around the rotational axis RA. In any case, the mount extension 1180 is pivotally coupled to the piston 270 at least partially housed in the case extension 204, as further discussed below.

In the illustrative embodiment, the indexing flange 1160, the mount extension 1170, and the mount extension 1180 define separate structures and/or sections of the plate 240 that are spaced from one another and appended to the body 1150. The illustrative plate 240 includes an arcuate section 1166 that interconnects the body 1150 and the mount extension 1170 and an arcuate section 1176 that interconnects the body 1150 and the mount extension 1180. The arcuate section 1166 defines at least one bend 1168 between the body 1150 and the mount extension 1170, whereas the arcuate section 1176 defines at least one bend 1178 between the body 150 and the mount extension 1180. In some embodiments, the arcuate sections 1166, 1176 are similar or identical structures of the plate 240 that are arranged opposite one another. Additionally, in some embodiments, each of the arcuate sections 1166, 1176 includes, or is otherwise embodied as, a stiffening tab, rib, spine, or similar structure, as the case may be.

As best seen in FIG. 11, the bushing 280 is illustratively formed to include a pair of slots 1182 extending therethrough that are circumferentially spaced 180 degrees from one another about the rotational axis RA. The slots 1182 may at least partially define halves 1184, 1186 of the bushing 280 that are interconnected with one another, at least in some embodiments. Further, in some embodiments, the halves 1184, 1186 may include respective projections 1188, 1190. The slots 1182 may permit some degree of flexion and/or resiliency of the bushing 280 when the bushing 280 is mounted on the shaft 212. The projections 1188, 1190 may stiffen and/or reinforce the bushing 280 to offset a lack of stiffness imparted by the slots 1182. Additionally, the projections 1188, 1190 may limit axial movement of the bushing 280 relative to the plate 240 along the rotational axis RA.

Figure 12:
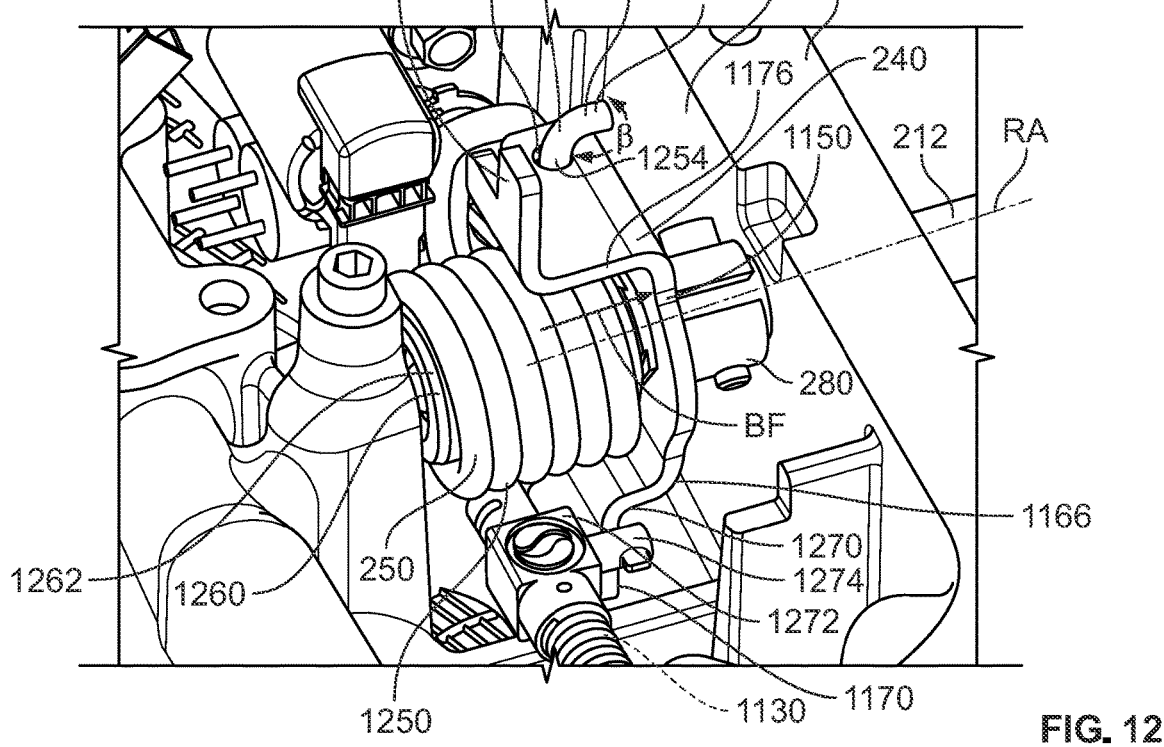
FIG. 12 is another perspective view of the actuation linkage of FIG. 11 illustrating a biasing element that applies a biasing force to the plate to urge the plate toward an interior wall of the main transmission case.

Referring now to FIG. 12, the biasing element 250 illustratively includes, or is otherwise embodied as, a torsional spring 1250. Of course, in other embodiments, the biasing element 250 may include, or otherwise be embodied as, another suitable structure. Regardless, the biasing element 250 is wound around the sleeve 1260 and at least partially retained around the rotational axis RA by the sleeve 1260 as indicated above. As discussed below, the biasing element 250 is coupled to the plate 240 and thereby at least partially retained around the rotational axis RA by the plate 240.

The arcuate section 1176 of the plate 240 is illustratively formed to include a mount aperture 1278 that is sized to receive a mount tang 1252 of the biasing element 250. When the mount tang 1252 extends through the mount aperture 1278 as shown in FIG. 12, the biasing element 250 is at least partially retained in place by the plate 240. In at least some embodiments, the mount aperture 1278 extends through the arcuate section 1176 in the direction D3, and the direction D3 is perpendicular or substantially perpendicular to the rotational axis RA.

In the illustrative embodiment, the mount tang 1252 includes portions 1254, 1256 that are interconnected with one another by a bend 1258. When the mount tang 1252 is received by the mount aperture 1278 as shown in FIG. 12, the portion 1254 extends through the mount aperture 1278 in the direction D3. Additionally, when the mount tang 1252 is received by the mount aperture 1278, the portion 1256 is arranged outside of the mount aperture 1278 at an angle R to the portion 1254. In some embodiments, the angle R is 90 degrees or about 90 degrees. In other embodiments, the angle R is less than 90 degrees.

The sleeve 1260 illustratively includes, or is otherwise embodied as, a cylindrical structure 1262 (e.g., a ring, a washer, or the like) supported by the shaft 212 and mounted on the rotational axis RA. The plate 240 of the actuation linkage 230 is arranged along the rotational axis RA at least partially between the sleeve 1260 and the bushing 280. Consequently, at least in some embodiments, the sleeve 1260 and the bushing 280 cooperate to at least partially locate the plate 240 along the rotational axis RA. Additionally, in some embodiments, the biasing element 250 is wound around the sleeve 1260 such that the sleeve 1260, the bushing 280, and the biasing element 250 cooperate to at least partially locate the plate 240 along the rotational axis RA.

In the illustrative embodiment, the sleeve 1260 is configured for linear movement along the rotational axis RA in use of the park system 200 as indicated above. Such linear movement may include, or otherwise be embodied as, axial float of the sleeve 1260 along the rotational axis RA over a short or relatively short distance toward or away from the bushing 280. In some embodiments, the sleeve 1260 is configured for linear translation along the rotational axis RA such that the sleeve 1260 contacts the bushing 280. In such embodiments, contact between the sleeve 1260 and the bushing 280 may limit axial float of the sleeve 1260 along the rotational axis RA.

The rod 1130 is illustratively coupled to the mount extension 1170 of the plate 240 by a collar or collar assembly 1270 as shown in FIG. 12. The collar 1270 includes a mount block 1272 and a coupling pin 1274 that protrudes outwardly away from the mount block 1272 toward the interior wall 1204 of the main case 202. In some embodiments, the mount block 1272 and the coupling pin 1274 may be provided as separate structures affixed to one another. In other embodiments, the mount block 1272 and the coupling pin 1274 may be integrally formed as a single unitary structure. Regardless, in the illustrative embodiment, the coupling pin 1274 extends through the mount extension 1170 and the rod 1130 extends through the mount block 1272 to establish a pivotal coupling between the plate 240 and the rod 1130.

In some embodiments, the collar 1270 receives the rod 1130 to permit translation of the rod 1130 along the longitudinal axis LA' in response to movement of the piston 270 along the longitudinal axis LA. Additionally, in some embodiments, the coupling between the rod 1130 and the mount extension 1170 via the collar 1270 permits a degree of relative movement between the rod 1130 and the plate 240 in use of the park system 200. In one example, the collar 1270 permits some amount of movement of the rod 1130 relative to the mount extension 1170 along the longitudinal axis LA'. In some cases, the collar 1270 may permit a minimal amount of linear movement of the rod 1130 relative to the mount extension 1170 along the axis LA', such as zero or substantially zero linear movement, for instance. In another example, the collar 1270 permits some amount of rotational movement of the rod 1130 relative to the mount extension 1170. In some cases, the collar 1270 may permit a minimal amount of rotational movement of the rod 1130 relative to the mount extension 1170, such as zero or substantially zero rotational movement between the rod 1130 and the body mount extension 1170, for instance.

Referring now to FIGS. 13 and 14, in the illustrative embodiment, an end 1332 of the rod 1130 is coupled to, or integrally formed with, the carriage 316 which carries the rollers 314 as indicated above. In some embodiments, the end 1332 of the rod 1130 may be configured for direct interaction with the rollers 314. Although the rod 1130 is described herein as a component of the actuation linkage 230, the rod 1130 may be incorporated into the park assembly 210 and considered as a component of the park assembly 210, at least in some embodiments. In any case, the rod 1130 illustratively supports, and is at least partially surrounded by, a biasing element or spring 1340 such that the biasing element 1340 extends along the longitudinal axis LA' between the rollers 314 and the mount extension 1170 of the plate 240.

In the illustrative engaged state 1300 of the park assembly 210, the electro-hydraulic valve assembly 220 (e.g., the electro-hydraulic valve 824) delivers the pressure P1 to the actuation cavity 840 which has a magnitude insufficient to drive axial translation of the piston 270 along the longitudinal axis LA as indicated above. As such, in the illustrative state 1300, interaction between the mount extension 1180 and the piston 270 does not drive substantial or appreciable rotation of the plate 240 about the rotational axis RA. The biasing element 250 applies the biasing force BF to the plate 240 to urge interaction between the mount extension 1180 and the piston 270 in the engaged state 1300. The position sensor 360 detects one or more of the notches 1140 which provide an indication of the angular orientation of the plate 240 about the rotational axis RA in the engaged state 1300 of the park assembly 210.

Due to the magnitude of the pressure P1 and the corresponding application of zero or minimal fluid pressure to the actuation cavity 840, the head 1372 of the piston 270 illustratively abuts the inner shoulder 804 of the case extension 204 when the park assembly 210 is in the engaged state 1300. As a result, the head 1372 is spaced from a retaining ring 1380 located within the internal cavity 606 of the case extension 204 in the engaged state 1300 of the park assembly 210. In the engaged state 1300 of the park assembly 210, the piston shaft 1374 of the piston 270 is disposed in a bore 1382 that has a smaller diameter than the actuation cavity 840.

In the illustrative embodiment, as shown in FIGS. 14 and 16, the piston shaft 1374 of the piston 270 is formed to include grooves 1472, 1674 at an outer periphery 1476 thereof. In some embodiments, the grooves 1472, 1674 each have a conical cross-sectional shape. However, in other embodiments, the grooves 1472, 1674 may take the shape of other suitable geometric forms. Regardless, the grooves 1472, 1674 are spaced from one another in a direction indicated by arrow D4 that is parallel to the longitudinal axis LA.

As suggested above, in the illustrative embodiment, the locking pin 370 is sized for positioning in the groove 1472 or in the groove 1674 to block translation of the piston 270 along the longitudinal axis LA and thereby secure the piston 270 in place. When the park assembly 210 is in the engaged state 1300, the locking pin 370 extends into the internal cavity 606 such that the locking pin 370 is positioned in the groove 1472. The extended state of the locking pin 370 into the groove 1472 may correspond to, or otherwise be associated with, an energized or activated state of the locking pin 370.

Referring now to FIGS. 15 and 16, in the illustrative disengaged state 1500 of the park assembly 210, the electro-hydraulic valve assembly 220 (e.g., the electro-hydraulic valve 824) delivers the pressure P2 to the actuation cavity 840 which has a magnitude sufficient to drive axial translation of the piston 270 along the longitudinal axis LA as indicated above. As such, in the illustrative state 1500, interaction between the mount extension 1180 and the piston 270 drives appreciable rotation of the plate 240 about the rotational axis RA as the piston 270 translates along the longitudinal axis LA. The biasing element 250 applies the biasing force BF to the plate 240 to urge interaction between the mount extension 1180 and the piston 270 in the disengaged state 1500. The position sensor 360 detects one or more of the notches 1140 which provide an indication of the angular orientation of the plate 240 about the rotational axis RA in the disengaged state 1500 of the park assembly 210. It should be appreciated that in at least some embodiments, the one or more notches 1140 that may be detected by the position sensor 360 to indicate the disengaged state 1500 of the park assembly 210 are different from the one or more notches 1140 that may be detected by the position sensor 360 to indicate the engaged state 1300 of the park assembly 210.

Due to the magnitude of the pressure P2 and the corresponding application of appreciable fluid pressure to the actuation cavity 840, the head 1372 of the piston 270 is spaced from the inner shoulder 804 of the case extension 204 when the park assembly 210 is in the disengaged state 1500. The head 1372 illustratively abuts the retaining ring 1380 in the disengaged state 1500 of the park assembly 210. In the disengaged state 1500 of the park assembly 210, the piston shaft 1374 of the piston 270 is at least partially disposed in the bore 1382 and in the actuation cavity 840.

When the park assembly 210 is in the disengaged state 1500, the locking pin 370 extends into the internal cavity 606 such that the locking pin 370 is positioned in the groove 1674. The extended state of the locking pin 370 into the groove 1674 may correspond to, or otherwise be associated with, an energized or activated state of the locking pin 370 during the disengaged state 1500 of the park assembly 210.

Figure 17:
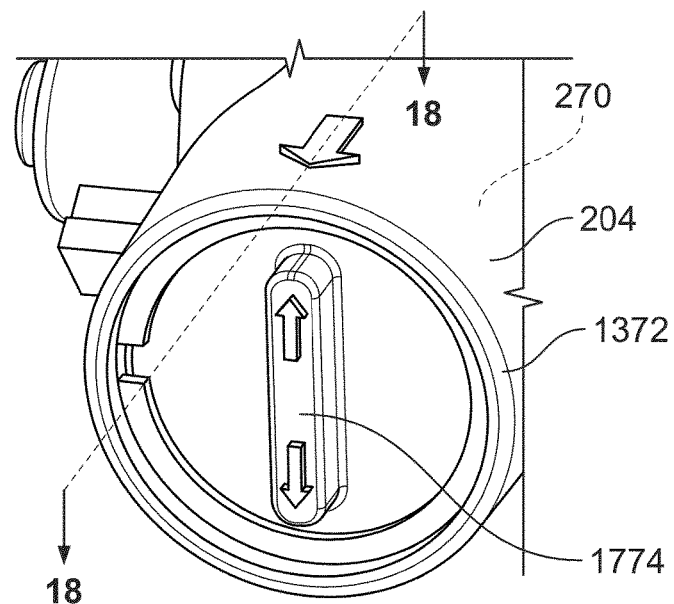
FIG. 17 is a perspective view showing a head of the piston disposed in the case extension shown in FIG. 6.
Figure 18:
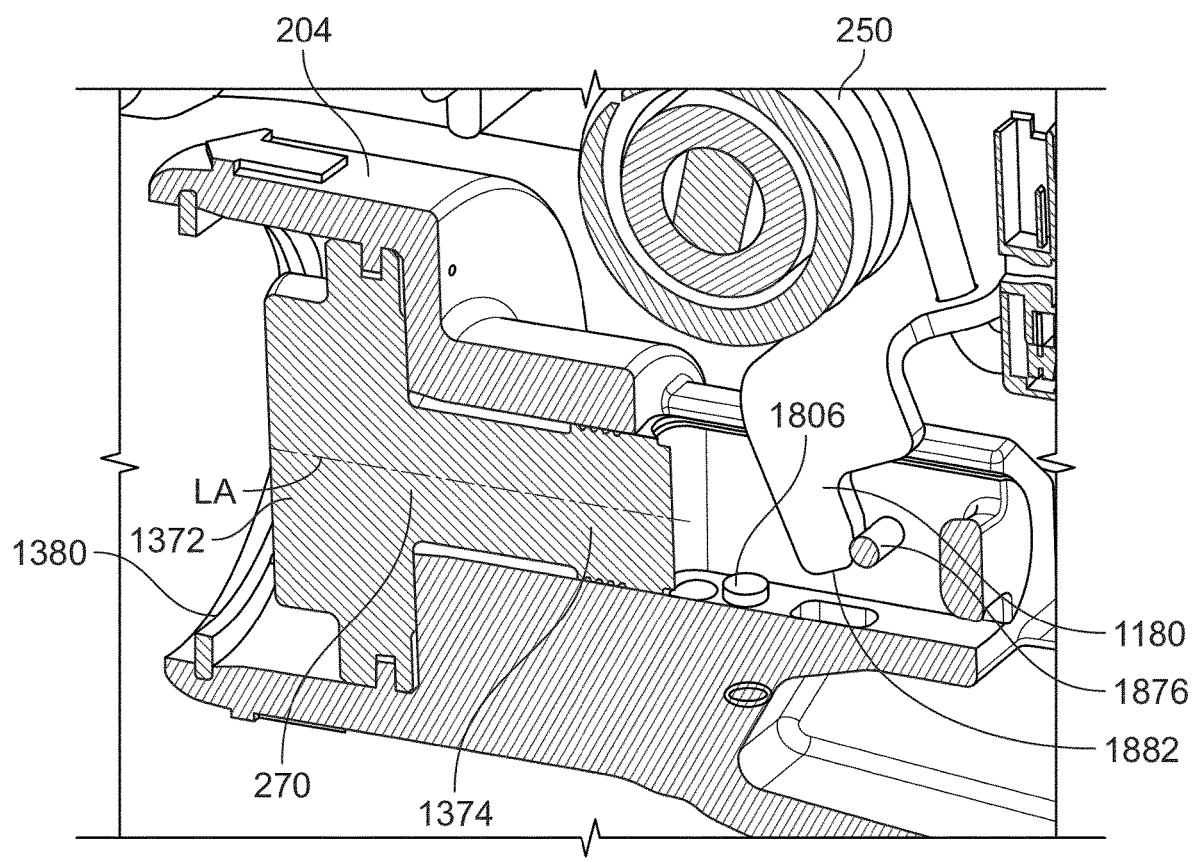
FIG. 18 is a sectional view of the case extension taken about line 18-18 showing the piston installed in the case extension in a specific orientation in the engaged and disengaged operating states of the park system.

Referring now to FIGS. 17 and 18, in the illustrative embodiment, the head 1372 of the piston 270 illustratively includes, or otherwise defines, an orientation indication bar 1774. In at least some embodiments, the orientation indication bar 1774 provides an indication of an installation orientation of the piston 270 in the case extension 204. As best seen in FIG. 17, when the piston 270 is installed in the case extension 204 and the secondary body 406 is removed, the orientation indication bar 1774 is observable from an exterior of the case extension 204. Thus, in some embodiments, at least partially based on the installation orientation indicated by the orientation indication bar 1774, a user may determine whether the piston 270 is installed in the case extension 204 in the proper orientation.

In the illustrative embodiment, the case extension 204 is formed to include an anti-rotation pin 1806 that is configured to resist rotation of the piston 270 (e.g., about the longitudinal axis LA) relative to the case extension 204 when the piston 270 is properly installed in the case extension 204. In some embodiments, the anti-rotation pin 1806 is configured for interaction (e.g., direct contact and/or interference) with the piston shaft 1374 of the piston 270. Additionally, in some embodiments, interaction between the anti-rotation pin 1806 and the piston 270 that resists rotation of the piston 270 relative to the case extension 204 may be indicative of installation of the piston 270 in the case extension 204 in the proper orientation. In those embodiments, rotational resistance effected by the anti-rotation pin 1806 may be observed in combination with the orientation indicated by the orientation indication bar 1774 to determine whether the piston 270 is installed in the case extension 204 in the proper orientation.

In the illustrative embodiment, as best seen in FIG. 18, the piston shaft 1374 of the piston 270 is formed to include a post 1876 that is configured for interaction with the mount extension 1180 of the plate 240. More specifically, the post 1876 is configured to directly contact a tab 1882 of the mount extension 1180 throughout operation of the park system 200. In at least some embodiments, the biasing force BF applied to the plate 240 by the biasing element 250 urges interaction between the post 1876 and the tab 1882 of the mount extension 1180 in each of the engaged and disengaged states 1300, 1500 of the park assembly 210.

Figure 19:
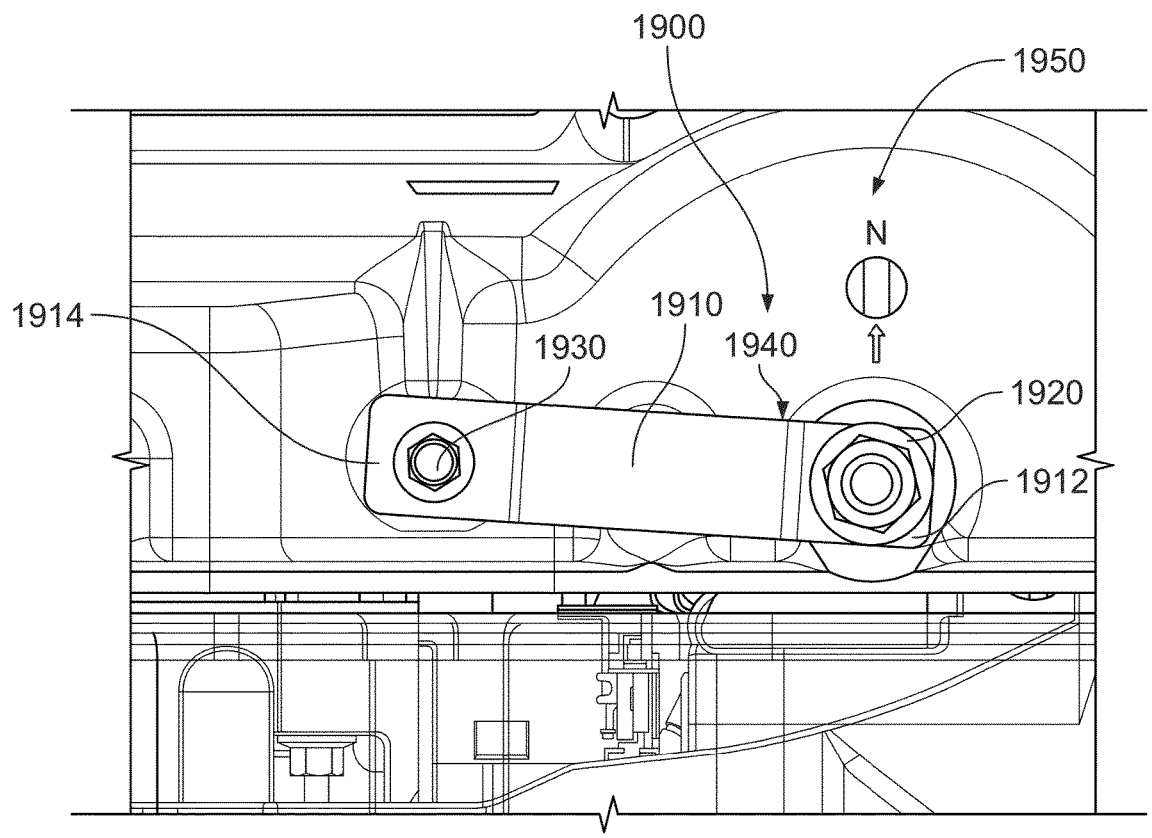
FIG. 19 is a front elevation view of a parking lock mechanism mountable to the main transmission case shown in FIG. 5.

Referring now to FIG. 19, the illustrative parking lock mechanism 1900 includes a lever 1910, a coupling nut 1920, and a fastener 1930. One end 1912 of the lever 1910 is pivotally coupled to the shaft 212 by the coupling nut 1920, and another end 1914 of the lever 1910 arranged opposite the one end 1912 is adapted for securement to the main case 202 of the transmission 102 using the fastener 1930. The illustrative positioning of the lever 1910 in FIG. 19 corresponds to, or is otherwise associated with, a disengaged or de-activated state 1940 of the parking lock mechanism 1900 in which a user has not manually manipulated the lever 1910 and the shaft 212 to place the park system 200 in a neutral operating mode. In the disengaged state 1940 of the parking lock mechanism 1900, hydraulic fluid is selectively delivered to the piston 270 to drive normal operation of the park assembly 210 in the engaged and disengaged states 1300, 1500.

In the illustrative embodiment, the parking lock mechanism 1900 is not installed on the transmission 120 during normal operation thereof. Rather, in the event of a failure or fault that prevents fluid from being delivered to the piston 270 during normal operation, the parking lock mechanism 1900 may be installed (e.g., by the vehicle operator) on the transmission 120 and manually manipulated to place the park system 200 in the disengaged state 1500. More specifically, in the event of a failure or fault, a user attaches the end 1912 of the lever 1910 to the shaft 212 and secures the end 1912 to the shaft 212 using the coupling nut 1920. Then, the user rotates the lever 1910 relative to the main case 202 to a neutral operating position 1950 depicted in FIG. 19. It should be appreciated that rotation of the lever 1910 to the neutral operating position 1950 drives rotation of the shaft 212 to place the park system 200 in the disengaged state 1500. After the lever 1910 is rotated to the neutral operating position 1950 and an aperture (not shown) formed in the lever 1910 adjacent the end 1914 is aligned with a corresponding aperture (not shown) formed in the main case 202, the user may secure the lever 1910 to the main case 202 by inserting the fastener 1930 through the apertures formed in the lever 1910 and the main case 202.

Figure 20:
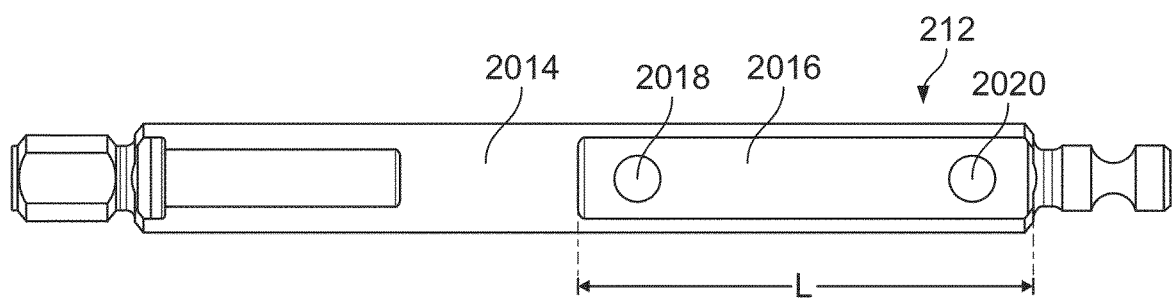
FIG. 20 is a front elevation view of a selector shaft adapted for use with the park system of FIG. 2.

Referring now to FIG. 20, the selector shaft 212 illustratively includes a shaft body 2014 having a generally cylindrical shape and at least one flat or planar section 2016 formed in the body 2014. The flat section 2016 is formed to include holes 2018, 2020 extending through the shaft 212. Compared to other configurations, the flat section 2016 may include a greater number of holes. Additionally, compared to other configurations, the flat section 2016 may have a longer length L.

Figure 21:
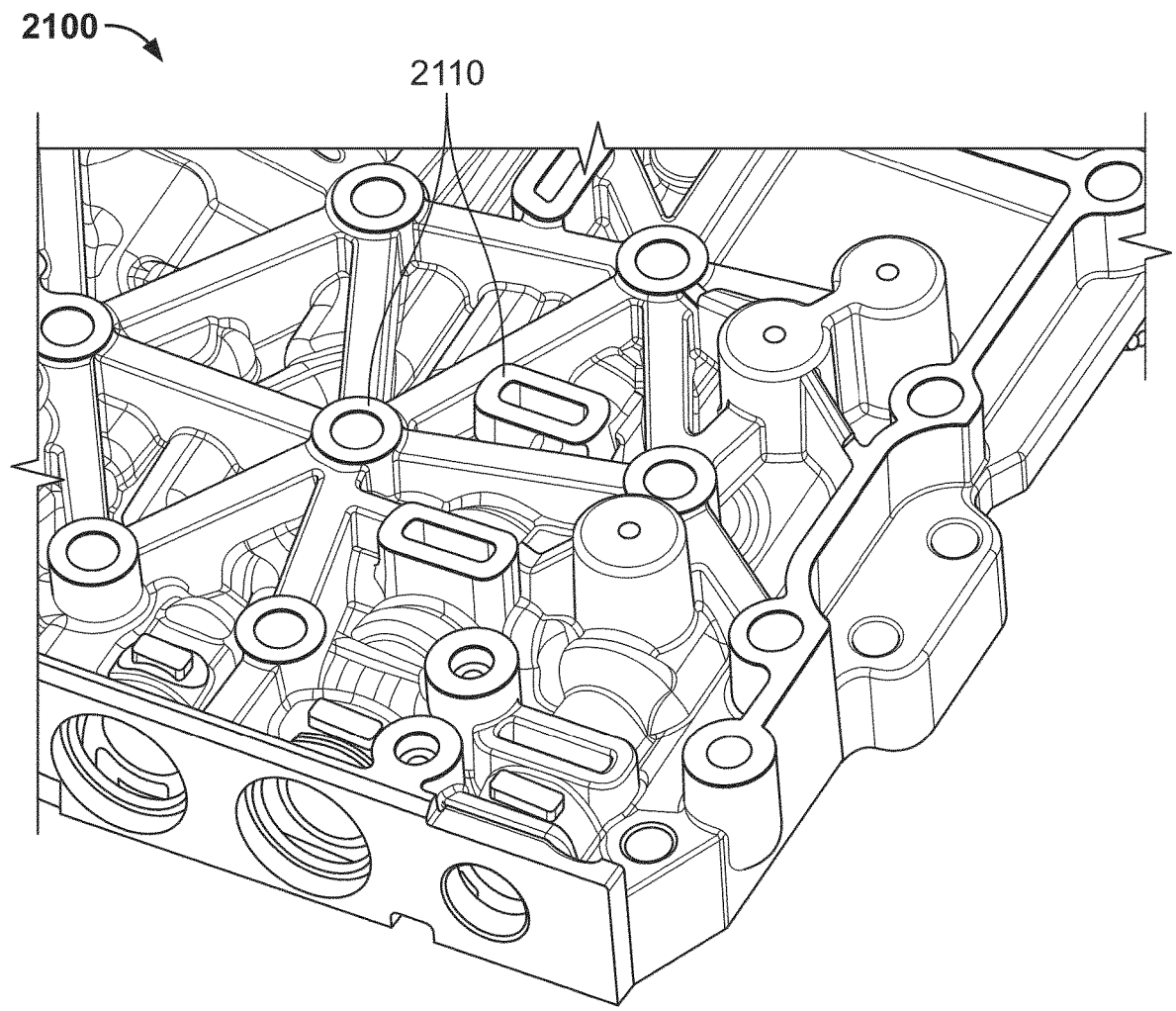
FIG. 21 is a perspective view of a fluid distribution manifold for an electro-hydraulic circuit showing various fluid paths and fluid communication ports.

Referring now to FIG. 21, a fluid distribution manifold 2100 for an electro-hydraulic circuit includes a network of features 2110 in fluid communication with one another to route hydraulic fluid to various structures and/or devices of a hydraulic system. The features 2110 include, but are not limited to, fluid passages, fluid ports, fluid paths, and the like.

Figure 22:
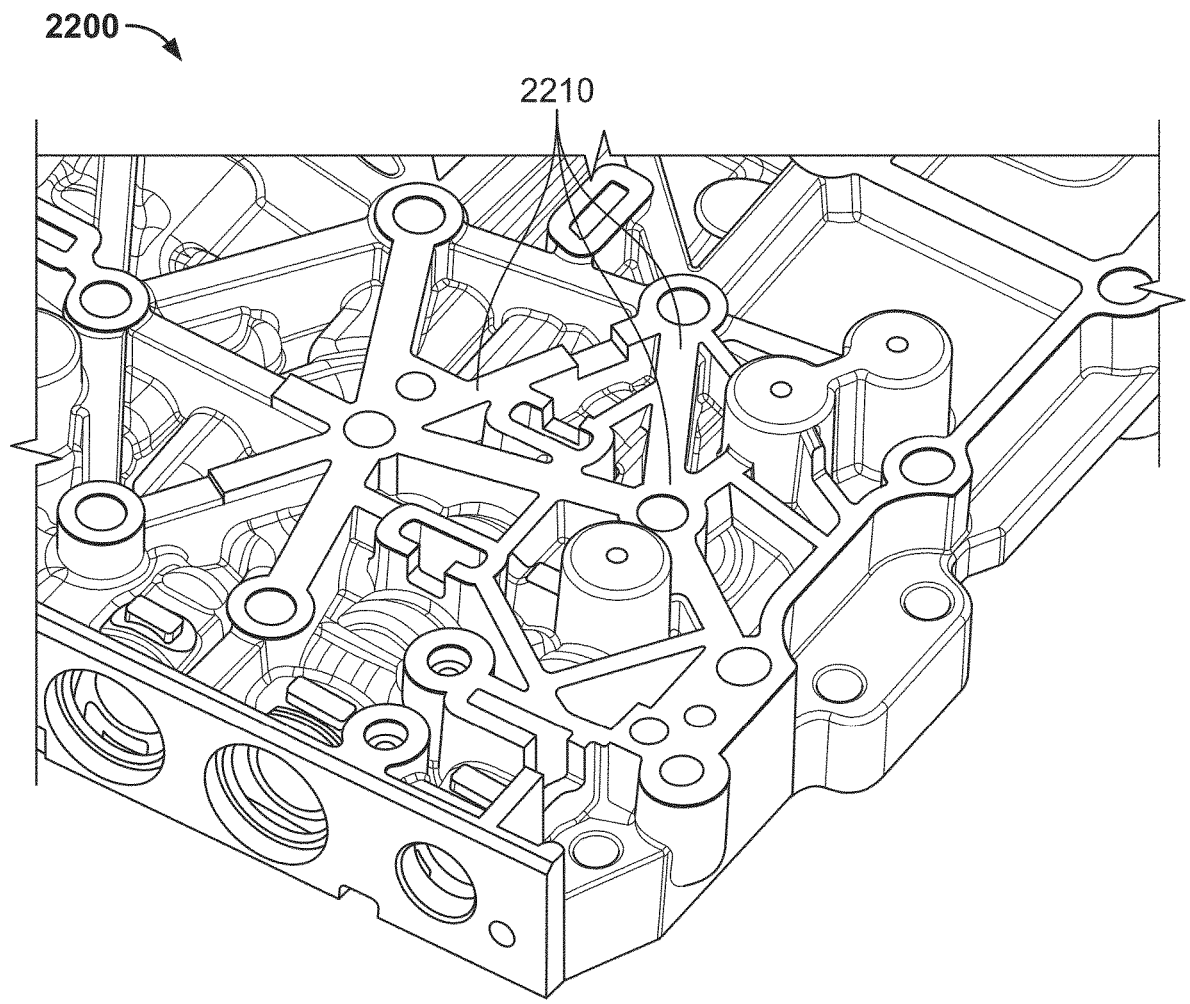
FIG. 22 is a perspective view depicting various fluid paths and fluid communication ports of a fluid distribution manifold for an electro-hydraulic circuit adapted for use with the park system of FIG. 2.

Referring now to FIG. 22, a fluid distribution manifold 2200 for an electro-hydraulic circuit is adapted for use with the park system 200. The manifold 2200 illustratively includes a network of features 2210 in fluid communication with one another to route hydraulic fluid to various structures and/or devices of a hydraulic system, such as the hydraulic system 2750 (see FIG. 27), for example. The features 2210 include, but are not limited to, fluid passages, fluid ports, fluid paths, and the like. At least in some embodiments, the fluid paths established by the features 2210 may be different from the fluid paths established by the features 2110.

Figure 23:
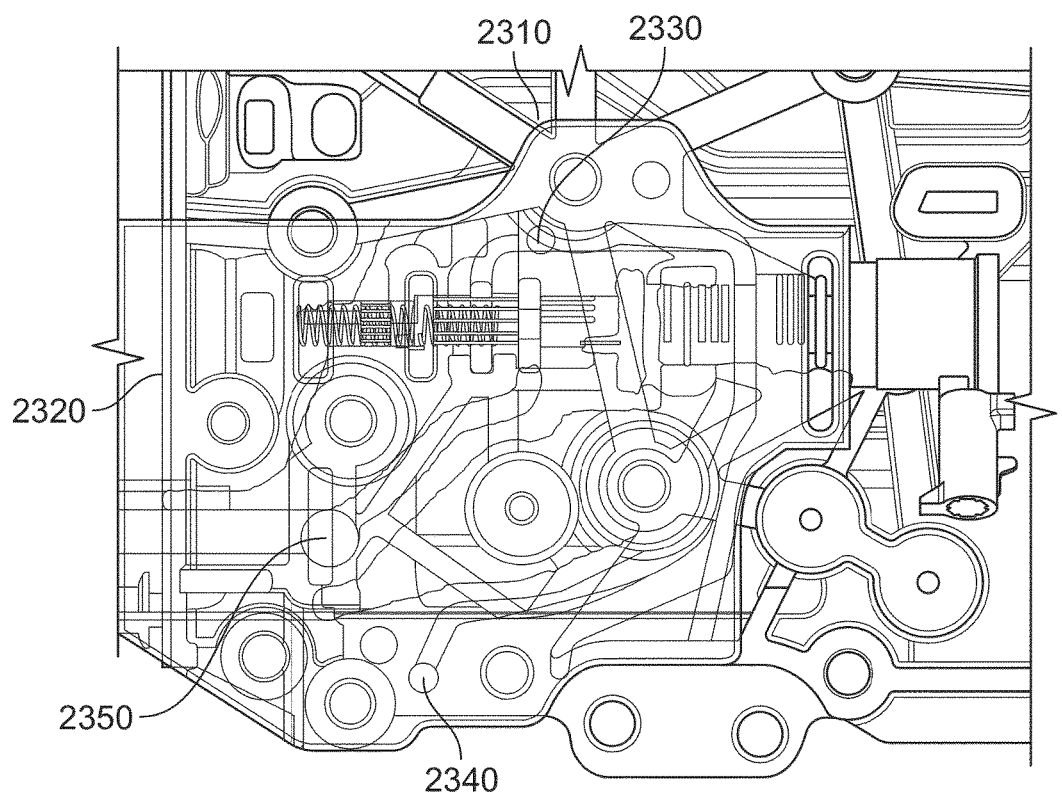
FIG. 23 is a top elevation view of a fluid distribution manifold for an electro-hydraulic circuit adapted for use with the park system of FIG. 2 that has a primary body and an auxiliary body in fluid communication with the primary body.

Referring now to FIG. 23, in at least some embodiments, a primary body 2310 and an auxiliary body 2320 cooperatively establish the fluid distribution manifold 2200. The primary body 2310 and the auxiliary body 2320 are in fluid communication with one another to cooperatively route fluid to various structures and/or devices of the park system 200, including the electro-hydraulic valve 824 and the piston 270. In one aspect, the features 2210 include a fluid port and/or passage 2330 through which the pressure P1 (e.g., the exhaust backfill pressure) may be routed to the actuation cavity 840 through the electro-hydraulic valve 824. In another respect, the features 2210 include a fluid port and/or passage 2340 through which the pressure P2 may be routed to the actuation cavity 840 through the electro-hydraulic valve 824. In yet another respect, the features 2210 include a fluid passage 2350 that fluidly couples the electro-hydraulic valve 824 to the actuation cavity 840.

Figure 24:
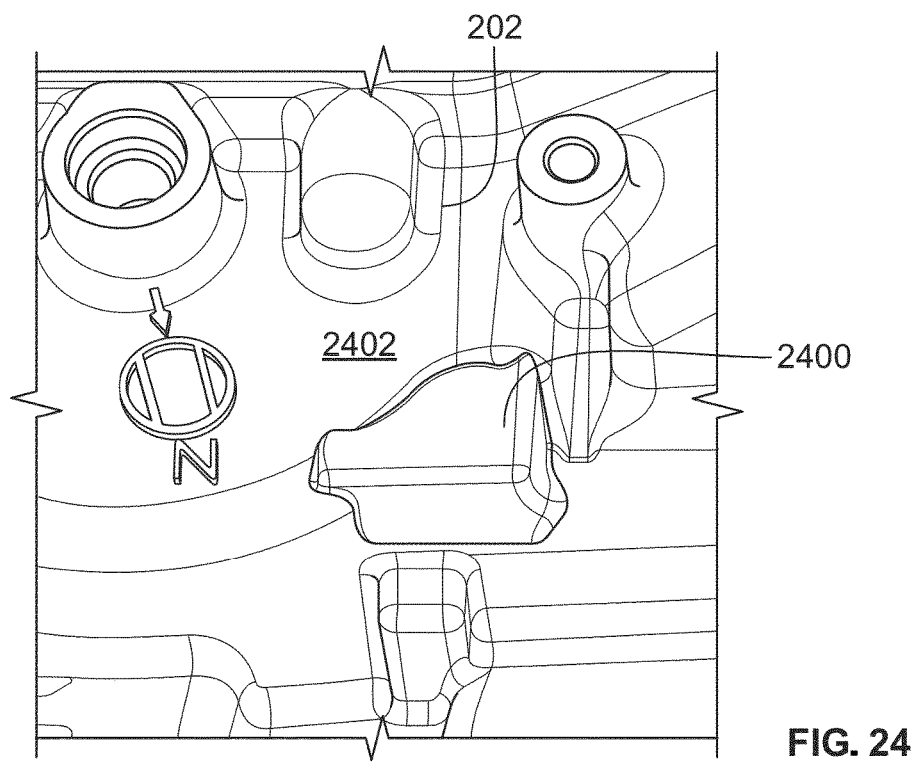
FIG. 24 is a magnified perspective view of the main transmission case shown in FIG. 5 illustrating various features formed on an exterior of the case.
Figure 25:
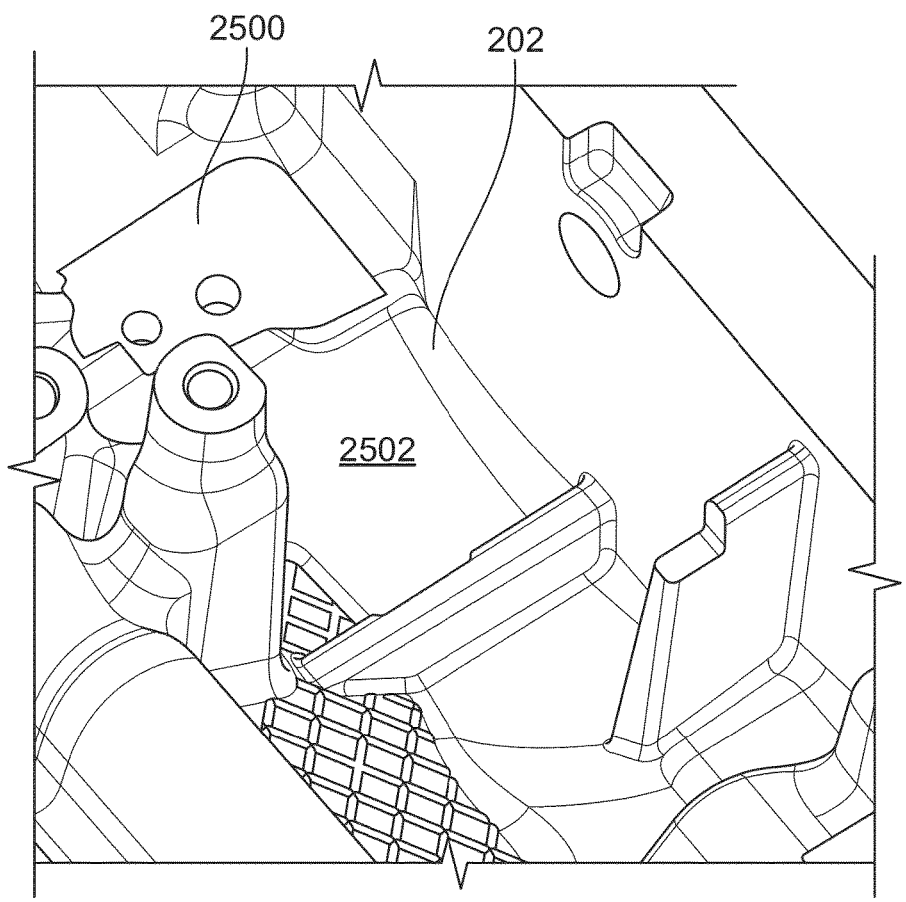
FIG. 25 is a magnified perspective view of the main transmission case similar to FIG. 24 illustrating various features formed on an interior of the case.

Referring now to FIGS. 24 and 25, in the illustrative embodiment, the main case 202 of the transmission 120 includes features 2400 formed on an exterior 2402 of the case 202. In some embodiments, the features 2400 formed on the exterior 2402 of the case 202 may be complemented by features 2500 formed on an interior 2502 of the case 202. The features 2400, 2500 may cooperate to route fluid through the main case 202 to various structures and/or devices of the park system 200, at least in some embodiments. The features 2400, 2500 may be omitted from other configurations.

Figure 26:
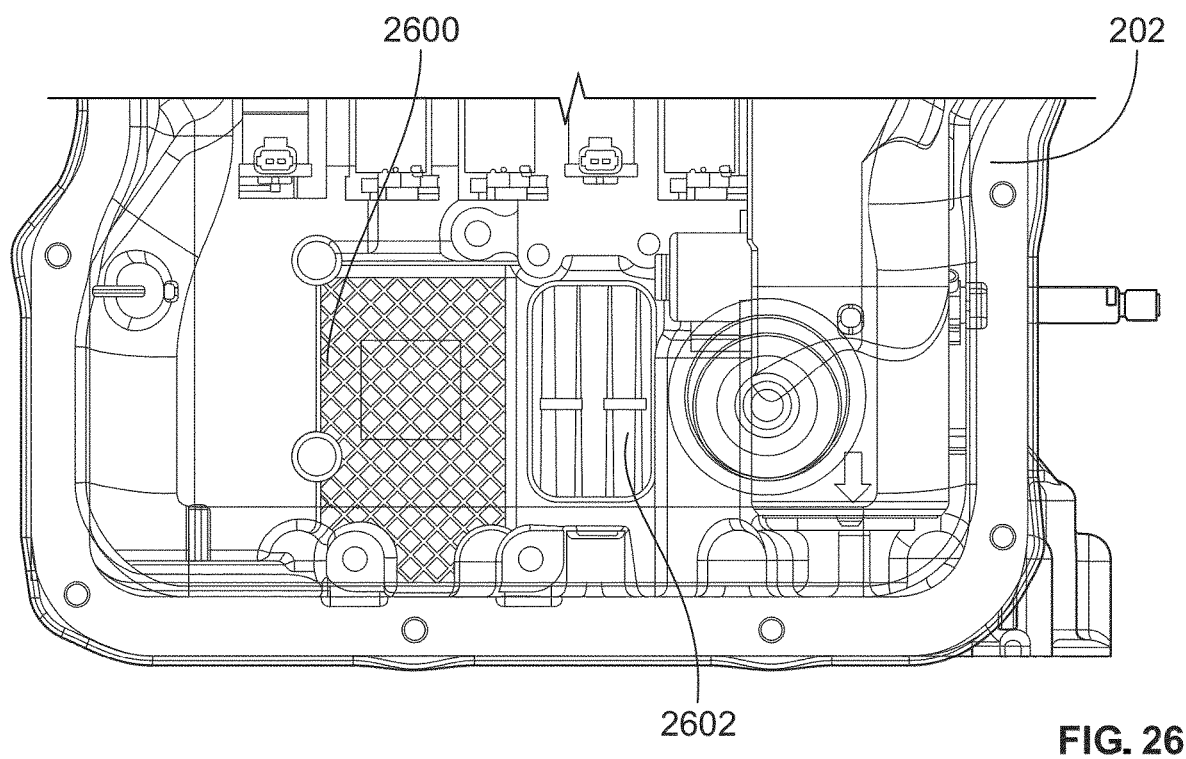
FIG. 26 is a top elevation view of the main transmission case shown in FIG. 5 depicting an oil pan included in a secondary body of the main transmission case.

Referring now to FIG. 26, in the illustrative embodiment, the main case 202 (e.g., the secondary body 406) includes an oil pan 2600 having a drain plug 2602. The oil pan 2600 is illustratively adapted for use with the park system 200. Compared to other configurations, the drain plug 2602 may be repositioned to facilitate use with the park system 200.

Figure 27:
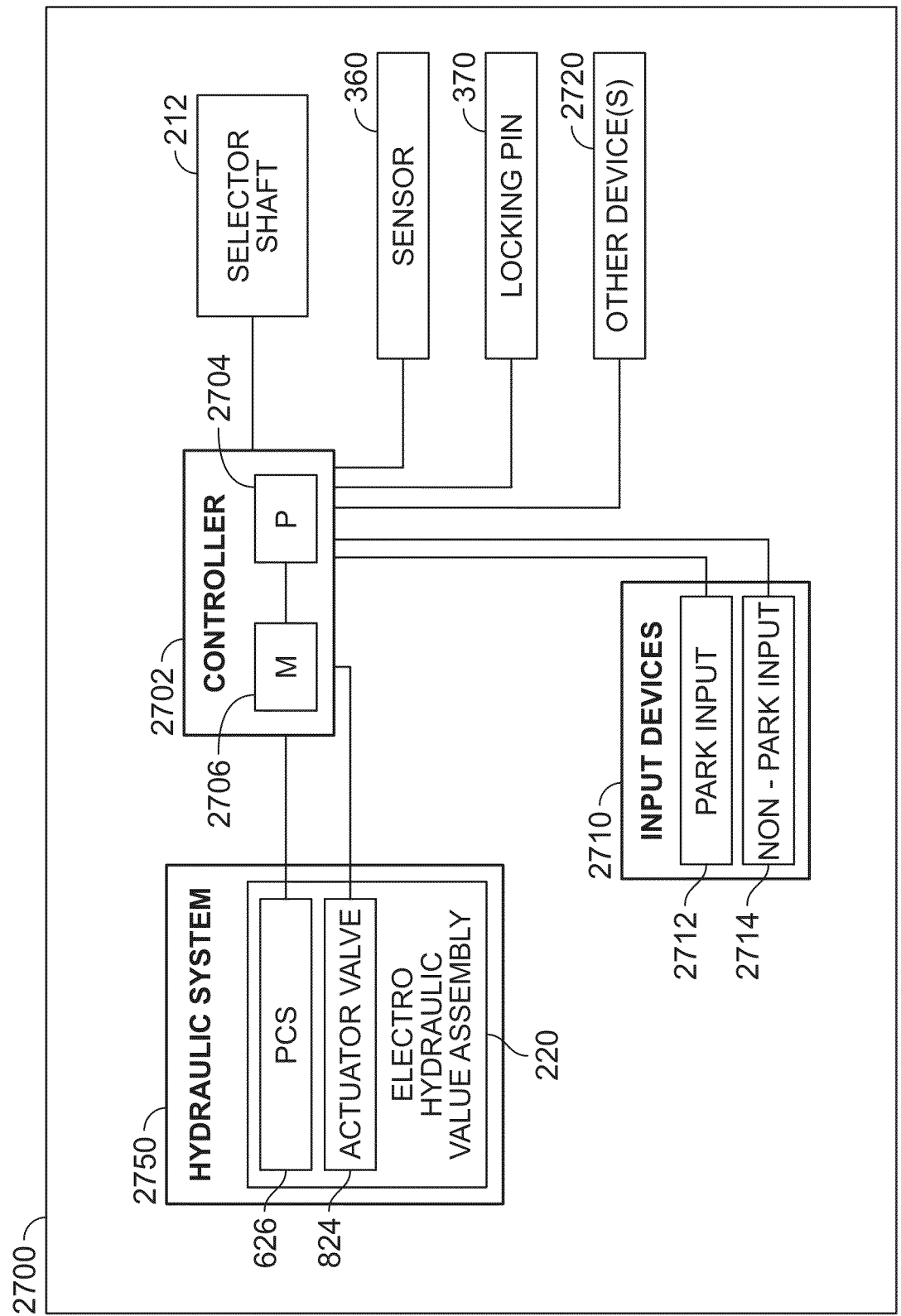
FIG. 27 is a diagrammatic view of a control system for the transmission shown in FIG. 1.

Referring now to FIG. 27, in the illustrative embodiment, the control system 2700 includes the hydraulic system 2750, the selector shaft 212, the position sensor 360, the locking pin 370, the controller 2702, input devices 2710, and other device(s) 2720. Each of the systems and/or devices 2750, 212, 360, 370, 2710, and 2720 is communicatively coupled to the controller 2702, such as by a direct (e.g., hardwired) connection or a controller area network (CAN) interface, for example. Of course, it should be appreciated that the control system 2700 may include other electrical and/or electromechanical devices in addition to, or as an alternative to, the devices depicted in FIG. 27. In any case, the illustrative controller 2702 includes a processor 2704 (or one or more processors) and at least one memory device 2706 communicatively coupled to the processor 2704.

The processor 2704 of the illustrative controller 2702 may be embodied as, or otherwise include, any type of processor, controller, or other compute circuit capable of performing various tasks such as compute functions and/or controlling the functions of the transmission 120 and/or the park system 200, for example. For example, the processor 2704 may be embodied as a single or multi-core processor(s), a microcontroller, or other processor or processing/controlling circuit. In some embodiments, the processor 2704 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 2704 may be embodied as, or otherwise include, a high-power processor, an accelerator co-processor, or a storage controller. In some embodiments still, the processor 2704 may include more than one processor, controller, or compute circuit.

The memory device 2706 of the illustrative controller 2702 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 2706 may be embodied as a block addressable memory, such as those based on NAND or NOR technologies. The memory device 2706 may also include future generation nonvolatile devices, such as a three dimensional crosspoint memory device (e.g., Intel 3D XPoint™ memory), or other byte addressable write-in-place nonvolatile memory devices. In some embodiments, the memory device 2706 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The illustrative hydraulic system 2750 includes the solenoid or pressure control solenoid (PCS) 626 which is communicatively coupled to the controller 2702. In the illustrative embodiment, the solenoid 626 includes, or is otherwise embodied as, any variable-force solenoid or collection of variable-force solenoids configured to receive input (e.g., one or more control signals) from the controller 2702 and supply variable hydraulic fluid pressure to the electro-hydraulic valve 824 in response to the input provided by the controller 2702. As evident from the discussion above, the solenoid 626 is configured to direct delivery of the fluid pressure P2 through the electro-hydraulic valve 824 to the actuation cavity 840 in the disengaged state 1500 of the park assembly 210. In some embodiments, the hydraulic fluid pressure P2 may correspond to a trim pressure regulated by a main regulator valve (not shown) of the hydraulic system 2750.

The illustrative hydraulic system 2750 also includes the electro-hydraulic or actuator valve 824 which is communicatively coupled to the controller 2702. As evident from the discussion above, the electro-hydraulic valve 824 includes, or is otherwise embodied as, a hydraulic actuator valve configured to convert fluid pressure into linear motion (e.g., of the valve element 822) to drive operation of the park system 200. In the illustrative embodiment, the electro-hydraulic valve 824 is fluidly coupled to the solenoid 626 as indicated above.

Although not shown, in some embodiments, the hydraulic system 2750 may include a number of devices in addition to those depicted in FIG. 27. Those devices may include, but are not limited to, one or more trim systems, sensors, controllers, pressure control solenoids, solenoid valves, relay valves, regulator valves, and flow control devices. The additional device(s) may be communicatively coupled to the controller 2702 to receive input (e.g., one or more control signals) therefrom and/or provide input thereto.

The selector shaft 212 illustratively includes, or is otherwise embodied as, a shift-by-cable selector shaft configured for movement (i.e., rotation) in response to an input (e.g., an operator input) received by the controller 2702. In some embodiments, in response to input provided by one of the input devices 2710, the controller 2702 is operable to direct rotation of the selector shaft 212 via one or more electrically-powered devices, such as one or more electric motors, electric actuators, or the like.

As indicated above, the position sensor 360 illustratively includes, or is otherwise embodied as, any electrical device or collection of electrical devices capable of generating a signal indicative of a position of one or more notches 1140 of the plate 240 about the rotational axis RA. The illustrative position sensor 360 includes a hall-effect sensor. Of course, in other embodiments, the sensor 360 may include another suitable device.

As mentioned above, the locking pin 370 illustratively includes, or is otherwise embodied as, a solenoid-driven locking pin sized for positioning in one of the grooves 1472, 1674 formed in the shaft 1374 of the piston 270. The locking pin (not shown) is configured to extend (e.g., when active or deployed) into, or retract (e.g., when inactive or stowed) outside of, the grooves 1472, 1674.

In the illustrative embodiment, the input devices 2710 include a park input 2712 and a non-park input 2714. Each of the inputs 2712 and 2714 is communicatively coupled to the controller 2702, at least in some embodiments. The park input 2712 includes, or is otherwise embodied as, an input device that may be selected by a user to direct operation of the transmission 120 and the park system 200 in a park operating mode corresponding to the engaged state 1300. The non-park input 2714 includes, or is otherwise embodied as, an input device that may be selected by a user to direct operation of the transmission 120 and the park system 200 in a non-park operation mode (e.g., a neutral or drive mode) corresponding to the disengaged state 1500.

In some embodiments, the other device(s) 2720 include one or more other electrical or electro-mechanical devices included in the park system 200, the transmission 120, and/or the drive system 100. The device(s) 2720 may be incorporated into, or otherwise associated with, the drive unit 102, the torque converter 108, the transmission 120, the gearing system 126, or the electro-hydraulic system 138, as the case may be. For example, the device(s) 2720 may include the speed sensors 146, 148, 150, at least in some embodiments. In another example, the device(s) 2720 may include the controller 160. Additionally, in some embodiments, the device(s) 2720 may include one or more sensors, controllers, solenoids, solenoid valves, and flow control devices, among other things.

Figure 28:
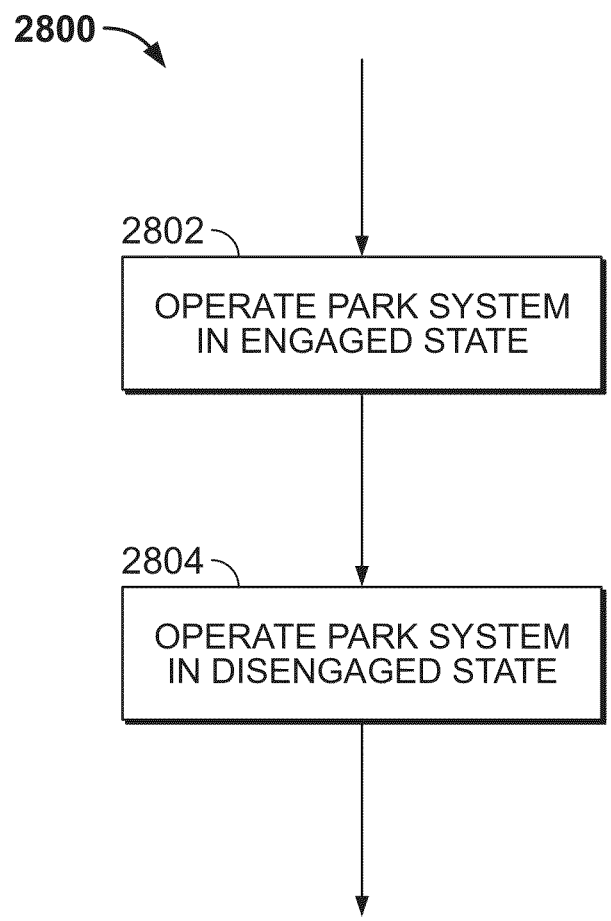
FIG. 28 is a simplified flowchart of a method of operating the transmission shown in FIG. 1.

Referring now to FIG. 28, an illustrative method 2800 of operating the transmission 120 may be embodied as, or otherwise include, a set of instructions that are executable by the control system 2700. The method 2800 corresponds to, or is otherwise associated with, performance of the blocks described below in the illustrative sequence of FIG. 28. It should be appreciated, however, that the method 2800 may be performed in one or more sequences different from the illustrative sequence.

The illustrative method 2800 begins with block 2802. In block 2802, the controller 2702 operates the transmission 120 and the park system 200 in the engaged state 1300. As a result, in block 2802, the controller 2702 resists rotation of the output shaft 124 using the park assembly 210 of the system 200. In the illustrative embodiment, to perform block 2802, the controller 2702 performs the method 2900 described below with reference to FIG. 29. From block 2802, the method 2800 proceeds to block 2804.

In block 2804 of the illustrative method 2800, the controller 2702 operates the transmission 120 and the park system 200 in the disengaged state 1500. Consequently, in block 2804, the controller 2702 allows rotation of the output shaft 124 using the park assembly 210 of the system 200. In the illustrative embodiment, to perform block 2804, the controller 702 performs the method 3000 described below with reference to FIG. 30.

Figure 29:
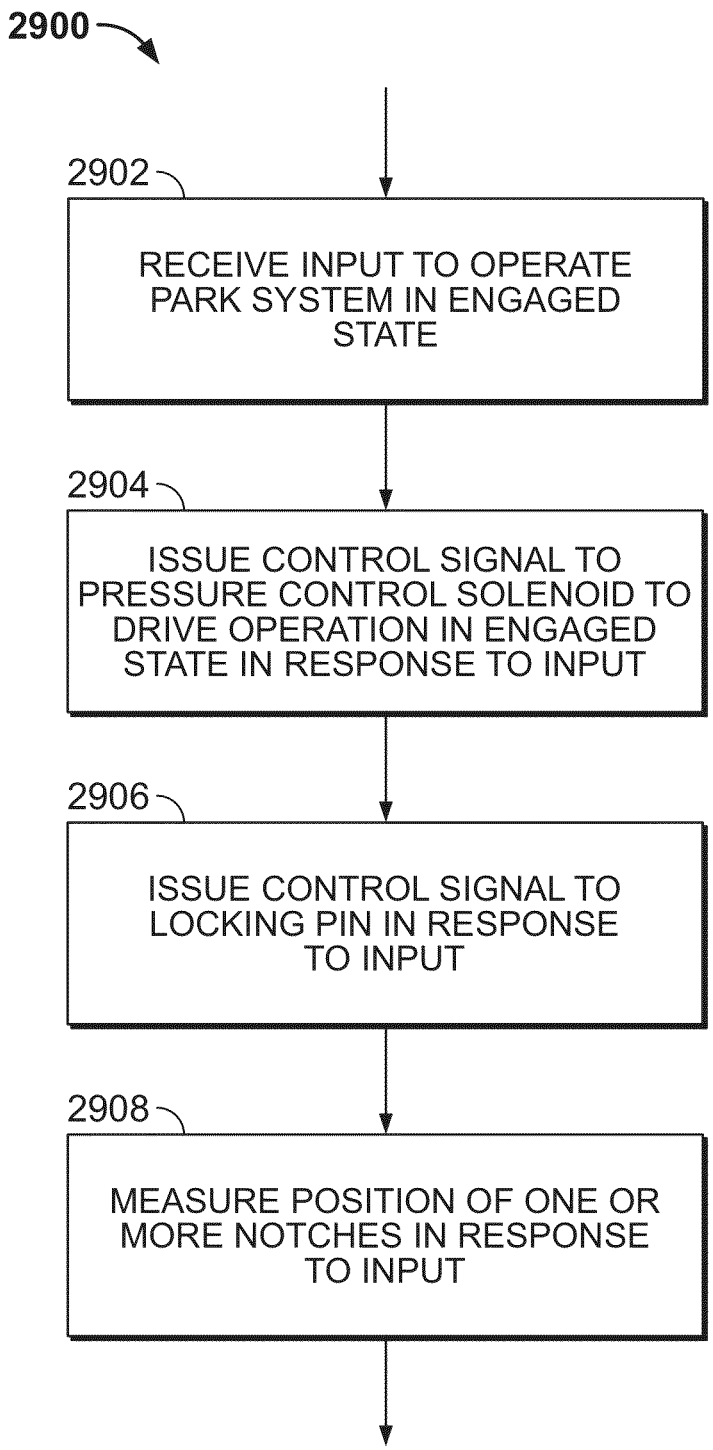
FIG. 29 is a simplified flowchart of a method of performing one of the blocks of the method of FIG. 28.

Referring now to FIG. 29, an illustrative method 2900 of operating the transmission 120 and the park system 200 in the engaged state 1300 may be embodied as, or otherwise include, a set of instructions that are executable by the control system 2700. The method 2900 corresponds to, or is otherwise associated with, performance of the blocks described below in the illustrative sequence of FIG. 29. It should be appreciated, however, that the method 2900 may be performed in one or more sequences different from the illustrative sequence.

The illustrative method 2900 begins with block 2902. In block 2902, the controller 2702 receives input (e.g., from a user) to operate the transmission 120 and the park system 200 in the engaged state 1300. For example, in block 2902, the controller 2702 may receive input from the park input 2712. In other embodiments, the controller 2702 may receive input from another input device indicative of desired operation in the engaged state 1300. From block 2902, the method 2900 proceeds to block 2904.

In block 2904 of the illustrative method 2900, the controller 2702 issues a control signal to the solenoid 626 to drive operation of the park system 200 in the engaged state 1300 in response to the input received in block 2902. In the illustrative embodiment, the control signal issued by the controller 2702 in block 2904 directs delivery of the fluid pressure P1 from the electro-hydraulic valve 824 to the actuation cavity 840. Following issuance of the control signal in block 2904, the groove 1472 should be aligned with the locking pin 370 as shown in FIG. 14. From block 2904, the method 2900 subsequently proceeds to block 2906.

In block 2906 of the illustrative method 2900, the controller 2702 issues a control signal to the locking pin 370 (e.g., the solenoid 674) to cause extension of the locking pin 370 into the groove 1472 in response to the input received in block 2902. As a result of the control signal issued by the controller 2702 in block 2906, movement of the piston 270 along the longitudinal axis LA is blocked by the locking pin 370 and the piston 270 is maintained in the position corresponding to the engaged state 1300. From block 2906, the method 2900 proceeds to block 2908.

In block 2908 of the illustrative method 2900, the controller 2702 measures a position or angular orientation of one or more notches 1140 of the plate 240 about the rotational axis RA in response to the input received in block 2902. It should be appreciated that measurement is performed in block 2908 with, and based on, a position of the one or more notches 1140 about the rotational axis RA that is detected by the position sensor 360. In some embodiments, the position measured in block 2908 may provide a diagnostic indicator for evaluating operation of the park system 200 in the engaged state 1300 in the use of the transmission 120.

Figure 30:
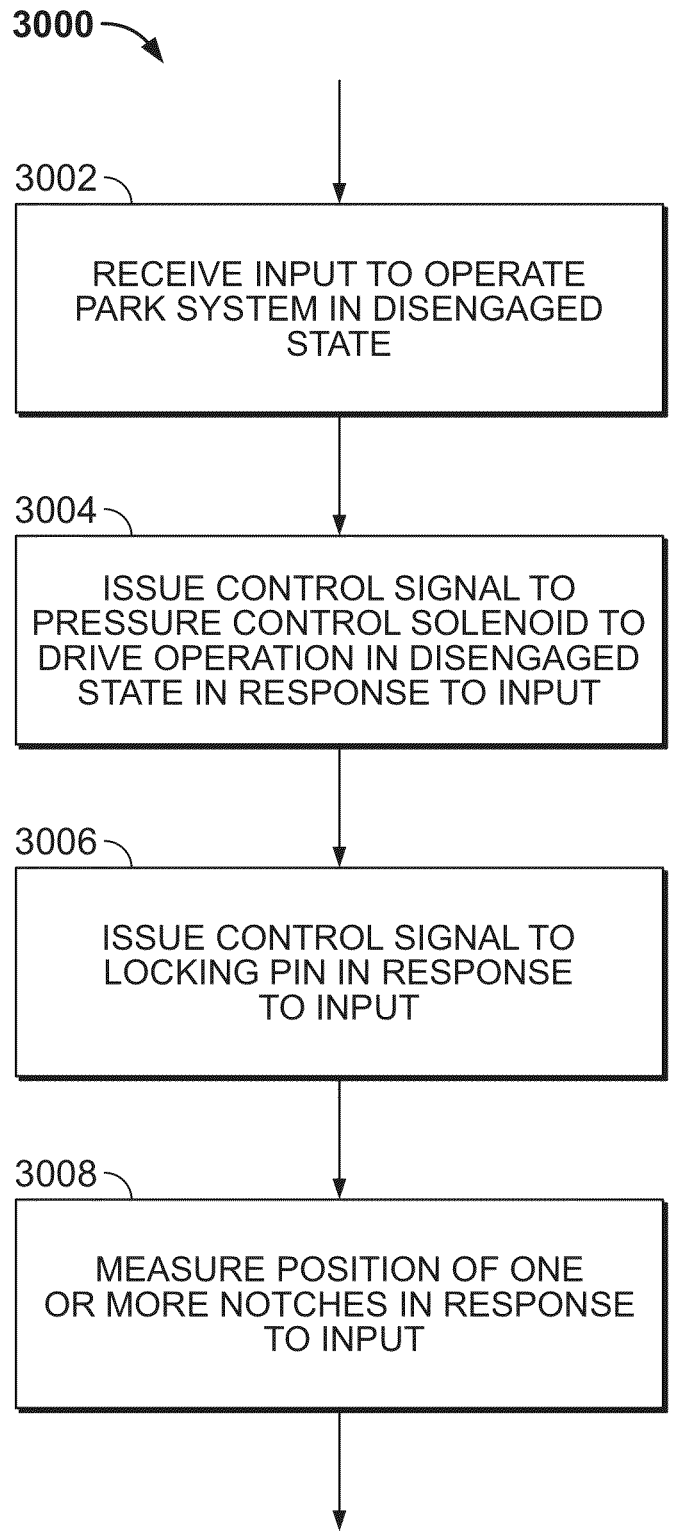
FIG. 30 is a simplified flowchart of a method of performing another one of the blocks of the method of FIG. 28.

Referring now to FIG. 30, an illustrative method 3000 of operating the transmission 120 and the park system 200 in the disengaged state 1500 may be embodied as, or otherwise include, a set of instructions that are executable by the control system 2700. The method 3000 corresponds to, or is otherwise associated with, performance of the blocks described below in the illustrative sequence of FIG. 30. It should be appreciated, however, that the method 3000 may be performed in one or more sequences different from the illustrative sequence.

The illustrative method 3000 begins with block 3002. In block 3002, the controller 2702 receives input (e.g., from a user) to operate the transmission 120 and the park system 200 in the disengaged state 1500. For example, in block 3002, the controller 2702 may receive input from the non-park input 2714. In other embodiments, the controller 2702 may receive input from another input device indicative of desired operation in the disengaged state 1500. From block 3002, the method 3000 proceeds to block 3004.

In block 3004 of the illustrative method 3000, the controller 2702 issues a control signal to the solenoid 626 to drive operation of the park system 200 in the disengaged state 1500 in response to the input received in block 3002. In the illustrative embodiment, the control signal issued by the controller 2702 in block 3004 directs delivery of the fluid pressure P2 from the electro-hydraulic valve 824 to the actuation cavity 840. Following issuance of the control signal in block 3004, the groove 1674 should be aligned with the locking pin 370 as shown in FIG. 16. From block 3004, the method 3000 subsequently proceeds to block 3006.

In block 3006 of the illustrative method 3000, the controller 2702 issues a control signal to the locking pin 370 (e.g., the solenoid 674) to cause extension of the locking pin 370 into the groove 1674 in response to the input received in block 3002. As a result of the control signal issued by the controller 2702 in block 3006, movement of the piston 270 along the longitudinal axis LA is blocked by the locking pin 370 and the piston 270 is maintained in the position corresponding to the disengaged state 1500. From block 3006, the method 3000 proceeds to block 3008.

In block 3008 of the illustrative method 3000, the controller 2702 measures a position or angular orientation of one or more notches 1140 of the plate 240 about the rotational axis RA in response to the input received in block 3002. It should be appreciated that measurement is performed in block 3008 with, and based on, a position of the one or more notches 1140 about the rotational axis RA that is detected by the position sensor 360. In some embodiments, the position measured in block 3008 may provide a diagnostic indicator for evaluating operation of the park system 200 in the disengaged state 1500 in the use of the transmission 120.

Figure 31:
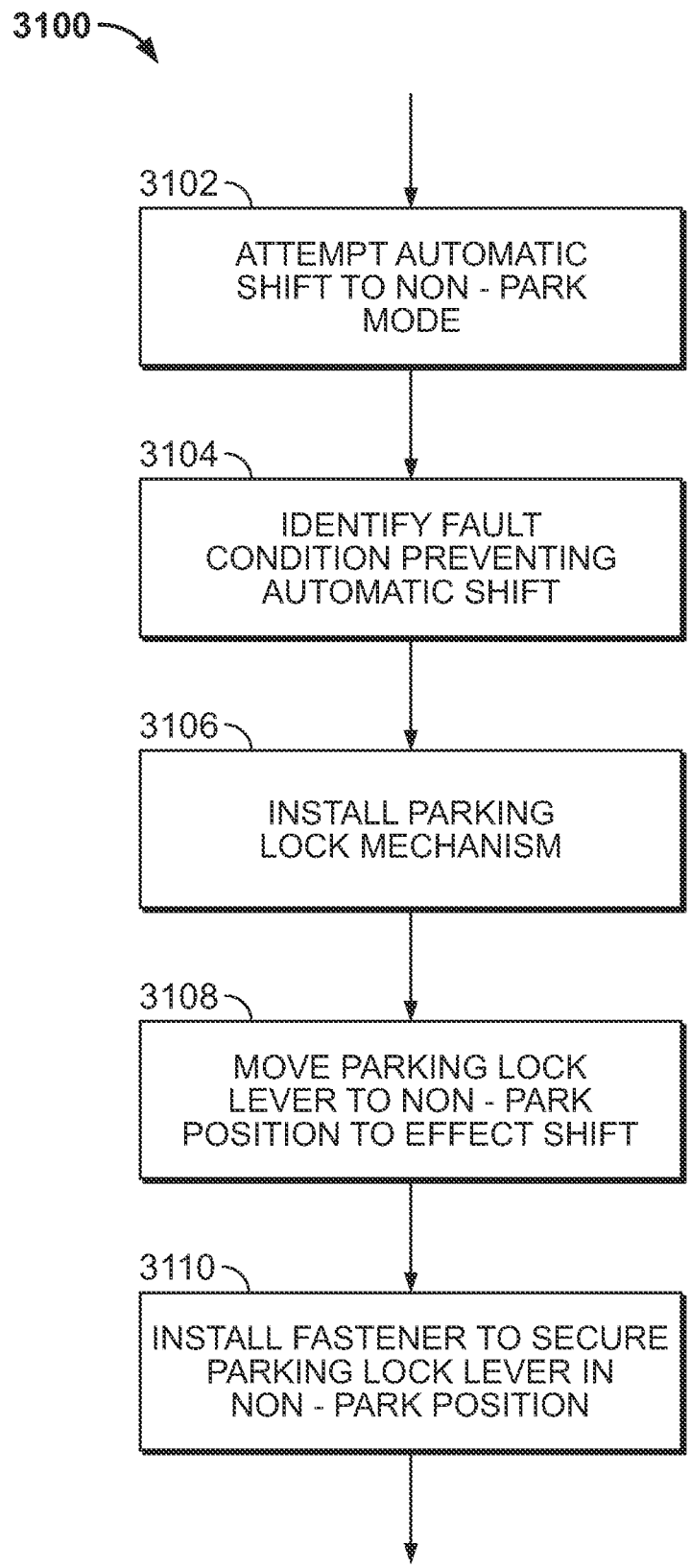
FIG. 31 is a simplified flowchart of a method of operating the parking lock mechanism shown in FIG. 19.

Referring now to FIG. 31, an illustrative method 3100 of operating the parking lock mechanism 1900 to manually shift the transmission 120 and the park system 200 to a non-park operating mode (e.g., a neutral mode) is shown. In some embodiments, one or more blocks of the illustrative method 3100 may be manually performed by a user. In other embodiments, one or more blocks of the illustrative method 3100 may be automatically performed by the control system 2700, and in such embodiments, one or more blocks of the method 3100 may be embodied as, or otherwise include, a set of instructions that are executable by the control system 2700. In any case, the method 3100 corresponds to, or is otherwise associated with, performance of the blocks described below in the illustrative sequence of FIG. 31. It should be appreciated, however, that the method 3100 may be performed in one or more sequences different from the illustrative sequence.

The illustrative method 3100 begins with block 3102. In block 3102, an automatic shift of the transmission 120 and the park system 200 to a non-park operating mode is attempted. To do so, in one example, the user may manipulate the non-park input 2714 to provide input to the controller 2702 indicative of the desired operation of the transmission 120 and the park system 200 in the disengaged state 1500 corresponding to the non-park operating mode. From block 3102, the method 3100 proceeds to block 3104.

In block 3104 of the illustrative method 3100, a failure or fault condition preventing the automatic shift attempted in block 3102 is identified. In some embodiments, input provided by the position sensor 360 to the controller 2702 may be indicative of a lack of rotation of the plate 240 about the rotational axis RA in response to the receipt of input in block 3102, and the lack of rotation detected by the position sensor 360 may serve to identify the fault condition in block 3104. Additionally, in some embodiments, input provided to the controller 2702 by one or more sensors associated with the electro-hydraulic valve assembly 220 (e.g., the electro-hydraulic valve 824) and/or the actuation linkage 230 (e.g., the piston 270) may indicate a lack of fluid pressure delivered to the actuation cavity 840 in response to the receipt of input in block 3102, and the lack of fluid pressure detected by the one or more sensors may serve to identify the fault condition in block 3104. In any case, from block 3104, the method 3100 proceeds to block 3106.

In block 3106 of the illustrative method 3100, the parking lock mechanism 1900 is installed on the transmission 120. More specifically, in block 3106, the user attaches the end 1912 of the lever 1910 to the shaft 212 and secures the end 1912 to the shaft 212 using the coupling nut 1920, as discussed above with reference to FIG. 19. From block 3106, the method 3100 proceeds to block 3108.

In block 3108 of the illustrative method 3100, the lever 1910 is rotated relative to the main case 202 to the neutral operation position 1950. As discussed above with reference to FIG. 19, manual rotation of the lever 1910 to the neutral operating position 1950 drives rotation of the selector shaft 212 to place the park system 200 in the disengaged state 1500. From block 3108, the method 3100 proceeds to block 3110.

In block 3110 of the illustrative method 3000, the fastener 1930 is installed in the main case 202 to secure the lever 1910 to the case 202 in the neutral operating position 1950. In some embodiments, performance of blocks 3106-3110 effects a manual shift of the transmission 120 and the park system 200 to the disengaged state 1500 associated with a non-park operating mode.

Figure 32:
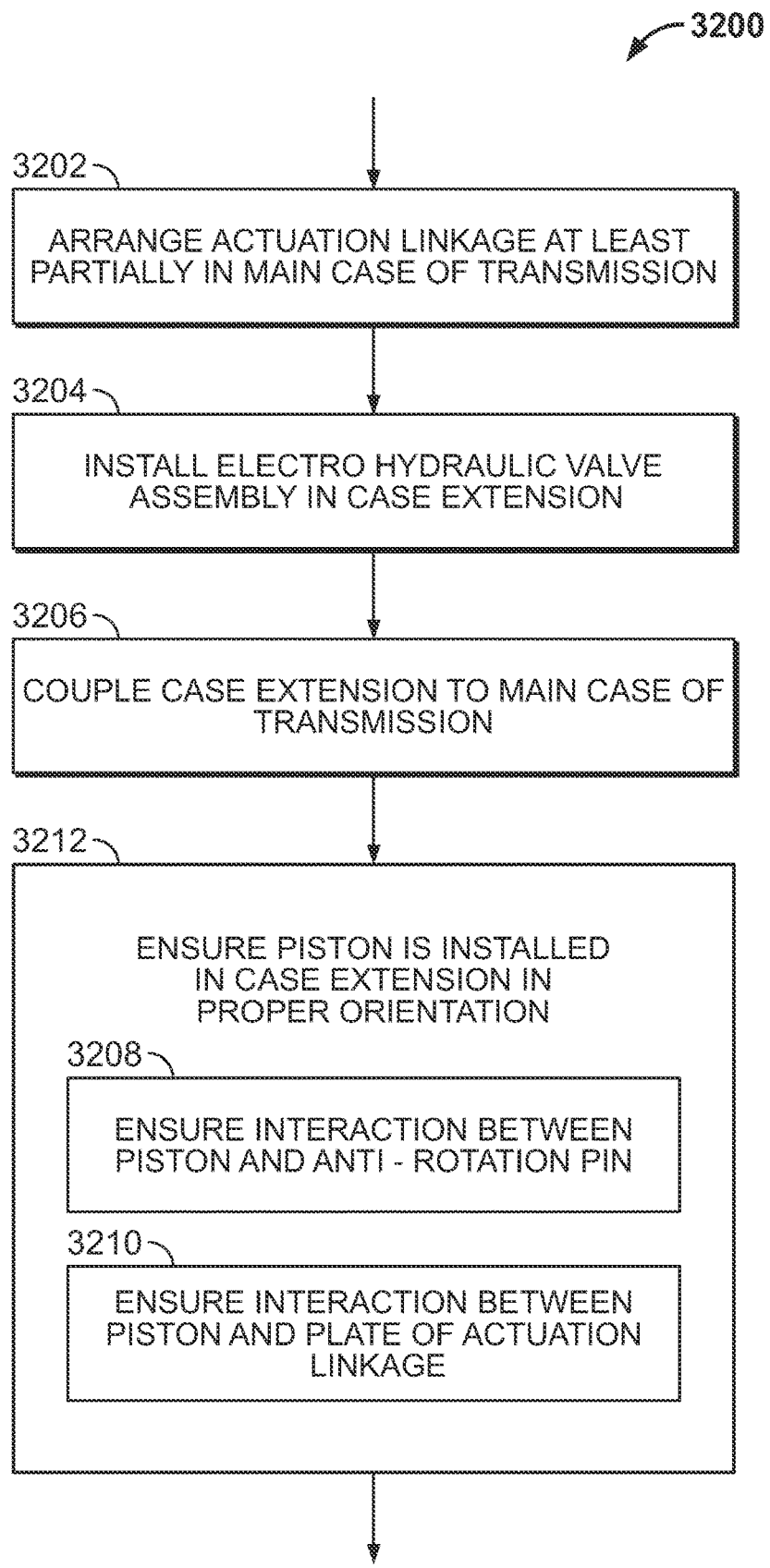
FIG. 32 is a simplified flowchart of a method of installing the piston in the case extension in the specific orientation depicted in FIG. 18.

Referring now to FIG. 32, an illustrative method 3200 of installing the piston 270 in the case extension 204 in the proper orientation is shown. In some embodiments, one or more blocks of the illustrative method 3200 may be manually performed by a user. In other embodiments, one or more blocks of the illustrative method 3200 may be automatically performed by the control system 2700, and in such embodiments, one or more blocks of the method 3200 may be embodied as, or otherwise include, a set of instructions that are executable by the control system 2700. In any case, the method 3200 corresponds to, or is otherwise associated with, performance of the blocks described below in the illustrative sequence of FIG. 32. It should be appreciated, however, that the method 3200 may be performed in one or more sequences different from the illustrative sequence.

The illustrative method 3200 begins with block 3202. In block 3202, the actuation linkage 230 is arranged at least partially in the main case 202 of the transmission 120. In some embodiments, the actuation linkage 230 is at least partially assembled before being arranged in the case 202 in block 3202. Additionally, in some embodiments, one or more structures of the actuation linkage 230 (e.g., the plate 240, the biasing element 250, the bushing 280, the rod 1130, the sleeve 1260, and/or the biasing element 1340) may be arranged at least partially in the main case 202 and assembled with one another in block 3202. In any case, from block 3202, the method 3200 proceeds to block 3204.

In block 3204 of the illustrative method 3200, the electro-hydraulic valve assembly 220 is installed and/or arranged in the case extension 204 of the transmission 120. In some embodiments, the electro-hydraulic valve assembly 220 is at least partially assembled before being installed in the case extension 204 in block 3204. Additionally, in some embodiments, one or more structures of the electro-hydraulic valve assembly 220 (e.g., the solenoid 626, the electro-hydraulic valve 824, and/or the clip) may be installed at least partially in the case extension 204 and assembled with one another in block 3204. Regardless, from block 3204, the method 3200 proceeds to block 3206.

In block 3206 of the illustrative method 3200, the case extension 204 is coupled to the main case 202 of the transmission 120. In some embodiments, the case extension 204 may be coupled to the main body 404 of the main case 202 in block 3206 such that the case extension 204 extends downwardly from, and is positioned below, the main body 404 as best seen in FIGS. 4 and 5. Additionally, in some embodiments, when the case extension 204 is coupled to the main body 404 in block 3206, the secondary body 406 is coupled to the main body 404 such that the case extension 204 is covered and housed by the secondary body 406 as best seen in FIGS. 4 and 5. In any case, from block 3206, the method 3200 proceeds to block 3212.

In block 3212 of the illustrative method 3200, a user and/or the control system 2700 ensures the piston 270 is installed in the case extension 204 in the proper orientation. To do so, in the illustrative embodiment, blocks 3208 and 3210 are performed. In block 3208, the user and/or the control system 2700 ensures the piston 270 is installed in the case extension 204 such that the piston 270 interacts with the anti-rotation pin 1806. As discussed above with reference to FIG. 18, interaction between the piston 270 and the anti-rotation pin 1806 restricts rotation of the piston 270 and may be indicative of installation of the piston 270 in the case extension 204 in the proper orientation. In block 3210, the user and/or the control system 2700 ensures the piston 270 is installed in the case extension 204 such that the piston 270 (e.g., the post 1876) interacts with the plate 240 (e.g., the mount extension 1180) of the actuation linkage 230. In some embodiments, in addition to the activities discussed above, block 3212 may include observing the orientation of the orientation indication bar 1774 to ensure the piston 270 is installed in the case extension 204 in the proper orientation.

Figure 33:
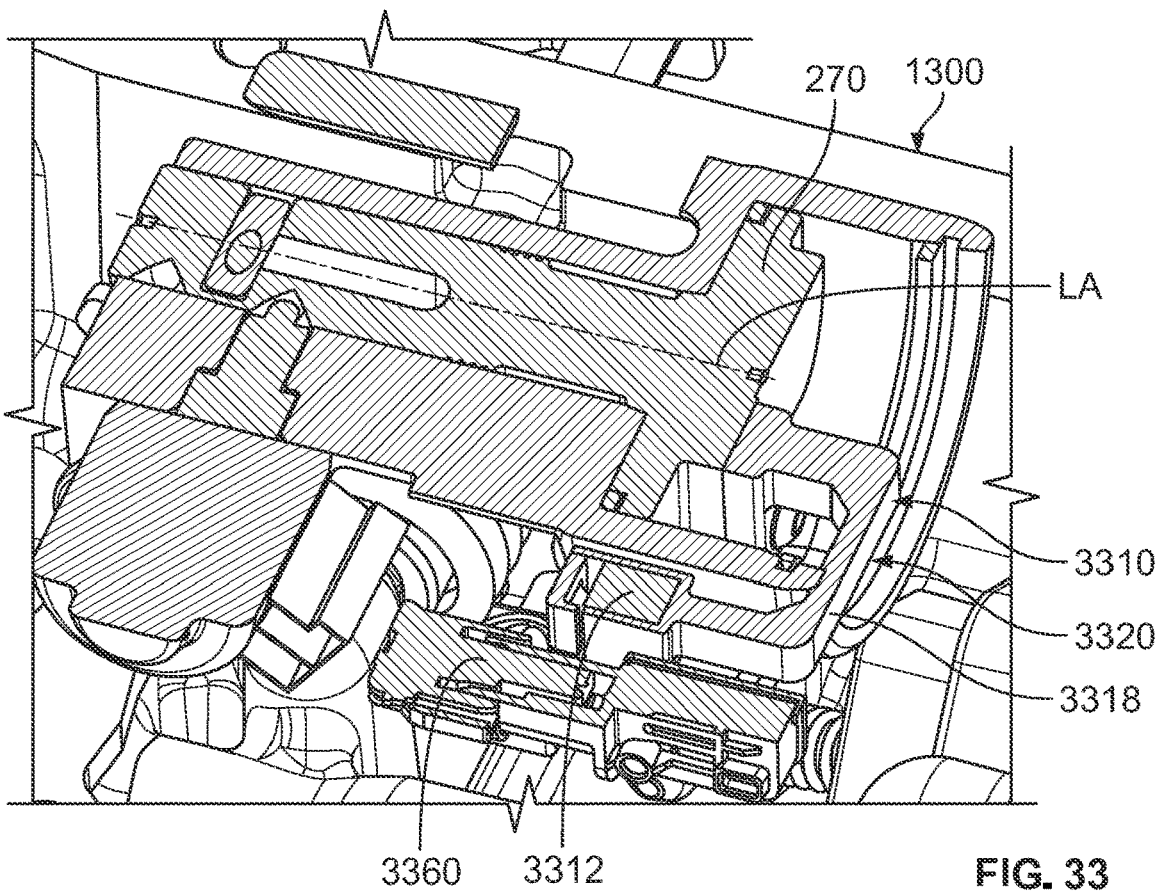
FIG. 33 is a perspective view of a magnet assembly affixed to the piston when the park system is in the engaged operating state.
Figure 34:
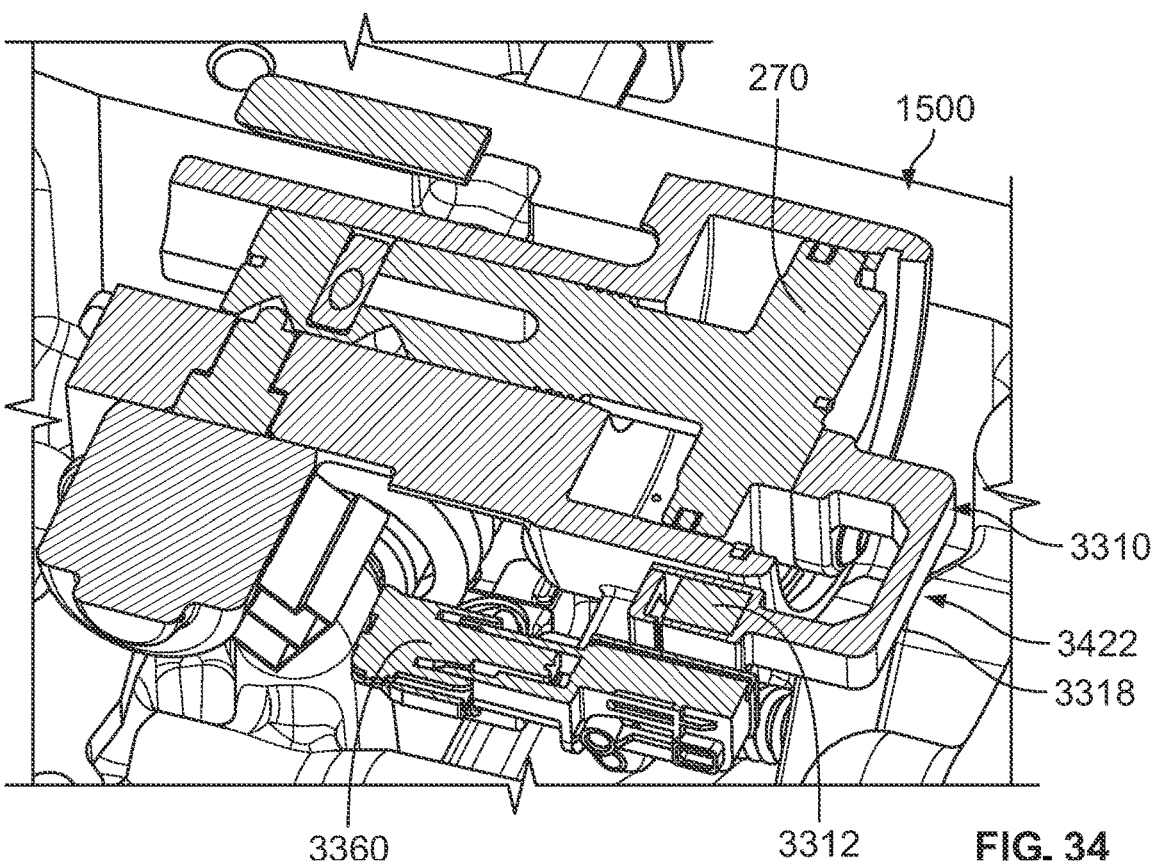
FIG. 34 is a perspective view of the magnet assembly shown in FIG. 33 when the park system is in the disengaged operating state.

Referring now to FIGS. 33 and 34, in the illustrative embodiment, a magnet assembly 3310 is directly affixed to the piston 270 such that the magnet assembly 3310, and at least one magnet 3312 carried by the magnet assembly 3310, are movable with the piston 270 along, or in a direction parallel to, the longitudinal axis LA. As shown in FIG. 33, a position 3320 of the magnet assembly 3310 corresponds to, or is otherwise associated with, the engaged operating state 1300 of the park system 210. As shown in FIG. 34, a position 3422 of the magnet assembly 3310 corresponds to, or is otherwise associated with, the disengaged operating state 1500 of the park system 210. In comparison to the position 3320 of the magnet assembly 3310 shown in FIG. 33, the magnet assembly 3310 is shifted to the right in the position 3422 shown in FIG. 34.

In the illustrative embodiment, the magnet assembly 3310 is employed in conjunction with a position sensor 3360. The illustrative position sensor 3360 is mounted to the transmission 120 (e.g., to the main case 202) and configured to detect a position of the magnet(s) 3312 of the magnet assembly 3310. In some cases, the position sensor 3360 may be configured to detect a position of the magnet(s) 3312 along, or in a direction parallel to, the longitudinal axis LA during movement between the positions 3320, 3422 of the magnet assembly 3310. In some embodiments, the sensor 3360 includes, or is otherwise embodied as, any electrical device or collection of electrical devices capable of detecting a position of the magnet(s) 3312 in use of the magnet assembly 3310. Additionally, in some embodiments, the sensor 3360 includes, or is otherwise embodied as, a proximity sensor, such as a capacitive proximity sensor, an inductive proximity sensor, a hall effect sensor, or the like. Of course, in other embodiments, the sensor 3360 may include, or otherwise be embodied as, another suitable sensor. In any case, the sensor 3360 may be included in the control system 2700 and configured for communication with the controller 2702 in lieu of, or in conjunction with, the sensor 360.

In at least some embodiments, the magnet assembly 3310 and the position sensor 3360 may form a portion of, or otherwise provide, a position sensing system that is implemented as an alternative to the aforementioned position sensing system including the indexing flange 1160 and the position sensor 360. In such embodiments, the indexing flange 1160 and the position sensor 360 may be omitted entirely. That omission may facilitate compact packaging and space-saving compared to cases in which the indexing flange 1160 and the position sensor 360 are present.

Figure 35:
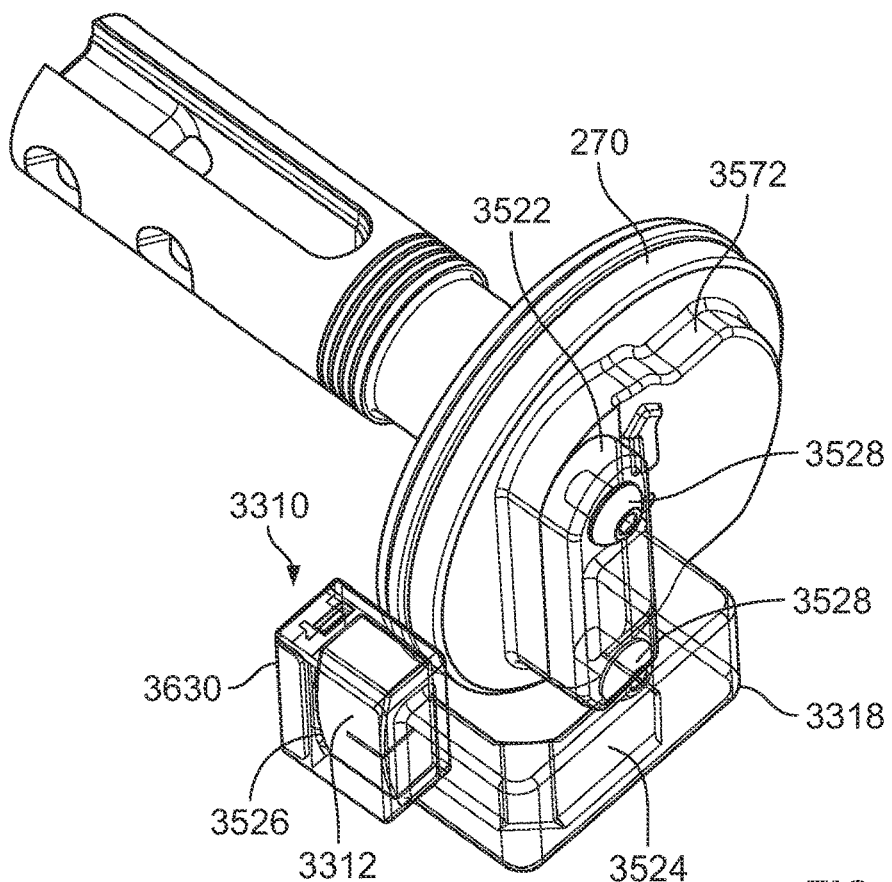
FIG. 35 is a perspective view of the magnet assembly of FIG. 33 showing a housing affixed to the piston that carries one or more magnets.

Referring now to FIG. 35, an illustrative housing 3318 of the magnet assembly 3310 includes a mount plate 3522 arranged in direct contact with a projection 3572 of the piston 270, a U-shaped support bracket 3524 interconnected with the mount plate 3522, and a magnet enclosure 3526 interconnected with the support bracket 3524 and arranged opposite the mount plate 3522. The mount plate 3522 is adapted to receive a pair of fasteners 3528 through apertures (not shown) formed thereinto affix the housing 3320 to the projection 3572 of the piston 270. The support bracket 3524 extends away from, and outwardly (e.g., in a radial direction) of, the mount plate 3522 to provide adequate clearance between the magnet enclosure 3526 and an outer diameter of the piston 270. The magnet enclosure 3526 is sized to carry the magnet(s) 3312 in an interior thereof that is closed off by a cap 3630.

Figure 36:
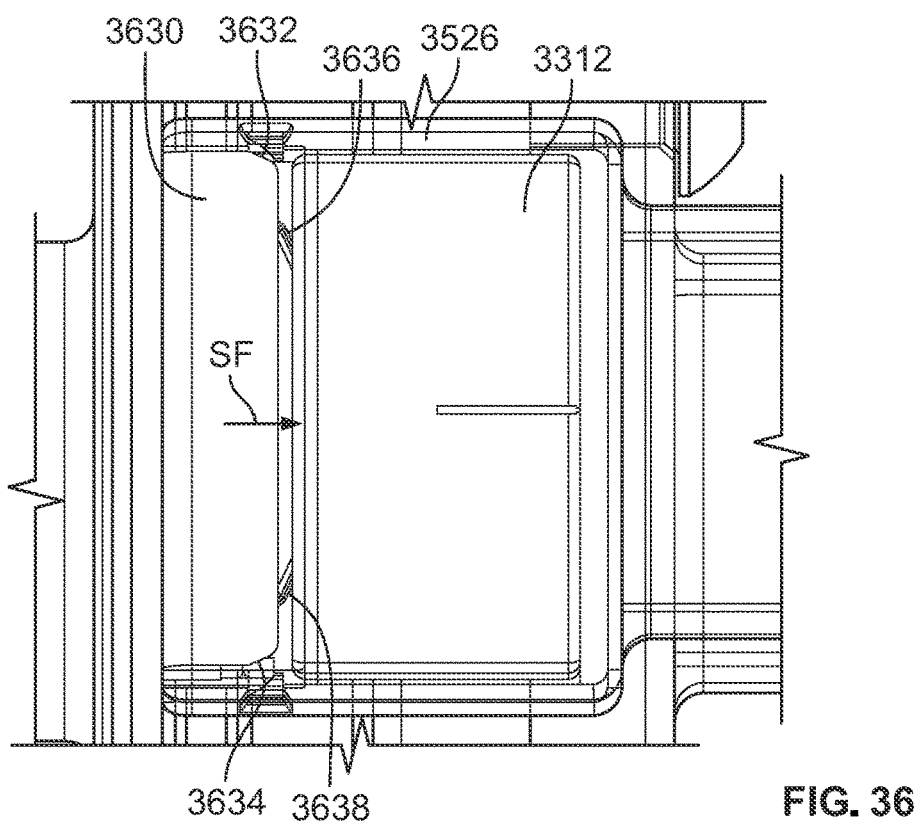
FIG. 36 is a magnified view of a portion of the housing shown in FIG. 35 depicting a magnet carried by the housing.

Referring now to FIG. 36, interaction between the cap 3630 and the magnet(s) 3312 held in the enclosure 3526 is illustrated in greater detail. The illustrative cap 3630 is formed to include clips 3632, 3634 arranged opposite one another at the periphery of the inner diameter of the cap 3630. The clips 3632, 3634 may include, or otherwise be embodied as, resilient features (e.g., clips or tabs) configured for interaction (e.g., snap-fit) with corresponding features (e.g., recesses or grooves) disposed on the interior of the enclosure 3526. Additionally, the cap 3630 includes clip springs or tangs 3636, 3638 arranged radially inward of the clips 3632, 3634 that are configured to directly contact the magnet(s) 3312 and apply a securing force thereto as indicated by the arrow SF. Application of the securing force SF to the magnet(s) 3312 illustratively secures the magnet(s) 3312 in place in the enclosure 3526.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission comprising:
an input shaft to receive torque from a drive unit;
an output shaft to transmit torque to a load; and
a park system to selectively brake the output shaft, the park system including
a park assembly,
an electro-hydraulic valve assembly to deliver one or more fluid pressures, and
an actuation linkage having a piston axially translatable along a longitudinal axis in response to the one or more fluid pressures delivered thereto from the electro-hydraulic valve assembly,
wherein:
the actuation linkage is coupled between the electro-hydraulic valve assembly and the park assembly such that translation of the piston along the longitudinal axis drives operation of the park assembly through the actuation linkage in (i) an engaged state, in which the park system resists rotation of the output shaft, and (ii) a disengaged state, in which the park system permits rotation of the output shaft,
the actuation linkage includes a plate pivotally coupled to the piston such that movement of the piston along the longitudinal axis causes rotation of the plate about a rotational axis,
the actuation linkage includes a biasing element surrounding the rotational axis that applies a biasing force to the plate to urge interaction between the plate and the piston,
the biasing element is wound around a sleeve of the actuation linkage such that the biasing element is at least partially retained around the rotational axis by the sleeve, and
the sleeve is mounted on the rotational axis and configured for linear movement along the rotational axis in use of the park system.

2. The transmission of claim 1, wherein:
the plate is formed to include at least one mount aperture, and
a mount tang of the biasing element extends through the at least one mount aperture such that the biasing element is at least partially retained in place by the plate.

3. The transmission of claim 2, wherein:
the at least one mount aperture extends through the plate in a direction at an angle relative to the rotational axis,
the mount tang includes a first portion and a second portion interconnected with one another by a bend,
the first portion extends through the at least one mount aperture in the direction, and
the second portion is arranged outside of the at least one mount aperture at an angle to the first portion.

4. The transmission of claim 1, wherein the plate is supported for rotation about the rotational axis by a bushing that is arranged between the plate and an interior surface of a case of the transmission.

5. The transmission of claim 4, wherein the plate is at least partially arranged along the rotational axis between the sleeve and the bushing.

6. The transmission of claim 1, wherein the plate includes a body that surrounds the rotational axis, a first mount extension appended to the body that extends outwardly away from the body in a first direction, and a second mount extension appended to the body opposite the first mount extension that extends outwardly away from the body in a second direction opposite the first direction.

7. The transmission of claim 6, wherein:
one of the first mount extension and the second mount extension is pivotally coupled to the piston, and
the other of the first mount extension and the second mount extension is pivotally coupled to a rod of the actuation linkage that is adapted for linear translation in use of the park system.

8. The transmission of claim 6, wherein the first mount extension and the second mount extension define separate structures spaced from one another.

9. The transmission of claim 1, wherein the park system comprises:
- a magnet assembly affixed to the piston for axial translation therewith that includes at least one magnet; and
- a position sensor to detect a position of the at least one magnet in use of the park system.

10. The transmission of claim 1, wherein:
- the piston is formed to include a first groove at an outer periphery thereof and a second groove at the outer periphery, and
- the first groove and the second groove are spaced from one another in a direction parallel to the longitudinal axis.

11. The transmission of claim 10, wherein:
- the park system comprises a locking pin sized for positioning in the first groove or the second groove to block translation of the piston along the longitudinal axis;
- when the park system is in the engaged state, the locking pin is positioned in one of the first groove and the second groove; and
- when the park system is in the disengaged state, the locking pin is positioned in the other of the first groove and the second groove.

12. A park system to selectively brake an output shaft of a transmission, the park system comprising:
- a park assembly,
- an electro-hydraulic valve assembly to deliver one or more fluid pressures, and
- an actuation linkage having a piston axially translatable along a longitudinal axis in response to the one or more fluid pressures delivered thereto from the electro-hydraulic valve assembly, wherein:
- the actuation linkage is coupled between the electro-hydraulic valve assembly and the park assembly such that translation of the piston along the longitudinal axis drives operation of the park assembly through the actuation linkage in (i) an engaged state, in which the park system resists rotation of the output shaft, and (ii) a disengaged state, in which the park system permits rotation of the output shaft,
- the actuation linkage includes a plate pivotally coupled to the piston such that movement of the piston along the longitudinal axis causes rotation of the plate about a rotational axis,
- the actuation linkage includes a sleeve mounted around the rotational axis that is configured for linear movement along the rotational axis in use of the park system,
- the plate is supported for rotation about the rotational axis by a bushing of the actuation linkage, and
- the plate is arranged along the rotational axis at least partially between the sleeve and the bushing.

13. The park system of claim 12, wherein the sleeve and the bushing cooperate to at least partially locate the plate along the rotational axis.

14. The park system of claim 12, wherein the bushing is formed to include a pair of slots extending therethrough that are circumferentially spaced 180 degrees from one another about the rotational axis.

15. The park system of claim 12, wherein the actuation linkage includes a biasing element surrounding the rotational axis that applies a biasing force to the plate to urge interaction between the plate and the piston.

16. The park system of claim 15, wherein the biasing element is wound around the sleeve such that the sleeve, the bushing, and the biasing element cooperate to at least partially locate the plate along the rotational axis.

17. The park system of claim 12, further comprising a magnet assembly affixed to the piston for axial translation therewith that includes at least one magnet.

18. The park system of claim 17, further comprising a position sensor to detect a position of the at least one magnet in use of the park system.

* * * * *